(12) United States Patent
Bitto et al.

(10) Patent No.: US 7,475,603 B2
(45) Date of Patent: Jan. 13, 2009

(54) MEASUREMENT TRANSDUCER OF VIBRATION-TYPE

(75) Inventors: Ennio Bitto, Aesch (CH); Gerhard Eckert, Rheinfelden (DE); Rainer Lorenz, Lörrach (DE); Alfred Rieder, Landshut (DE); Christian Schuetze, Basel (CH); Michal Fuchs, Eschbach (DE); Martin Anklin-Imhof, Dornach (DE); Wolfgang Drahm, Freising (DE); Leonhard Probst, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 29 days.

(21) Appl. No.: 11/599,420

(22) Filed: Nov. 15, 2006

(65) Prior Publication Data
US 2007/0119264 A1    May 31, 2007

Related U.S. Application Data

(60) Provisional application No. 60/736,855, filed on Nov. 16, 2005, provisional application No. 60/748,164, filed on Dec. 8, 2005.

(30) Foreign Application Priority Data
Nov. 15, 2005   (DE) .................... 10 2005 054 855
Dec. 7, 2005    (DE) .................... 10 2005 058 593

(51) Int. Cl.
*G01F 1/84*   (2006.01)
(52) U.S. Cl. ................................. 73/861.357
(58) Field of Classification Search ............ 73/861.357, 73/861.356, 861.355
See application file for complete search history.

(56) References Cited

U.S. PATENT DOCUMENTS 5,287,754 A    2/1994   Kazakis (Continued)

FOREIGN PATENT DOCUMENTS

DE    102 57 322 A1    6/2004

(Continued)

OTHER PUBLICATIONS

U.S. Appl. No. 11/599,480.*

(Continued)

*Primary Examiner*—Jewel Thompson
(74) *Attorney, Agent, or Firm*—Bacon & Thomas, PLLC

(57) ABSTRACT

The measurement transducer includes: A measuring tube vibrating at least at times during operation and serving for the conveying of a medium, wherein the measuring tube communicates with a pipeline via an inlet tube piece at an inlet end and an outlet tube piece at an outlet end; a counteroscillator, which is affixed to the measuring tube on the inlet end to form a first coupling zone and affixed to the measuring tube on the outlet end to form a second coupling zone; and a first cantilever for producing bending moments in the inlet tube piece and coupled with the inlet tube piece and the measuring tube essentially rigidly in the area of the first coupling zone and having a center of mass lying in the region of the inlet tube piece, as well as a second cantilever for producing bending moments in the outlet tube piece and coupled essentially rigidly with the outlet tube piece and the measuring tube in the region of the second coupling zone and having a center of mass lying in the region of the outlet tube piece. The measurement transducer of the invention is especially suited also for measuring tubes having large nominal diameters of more than 50 mm.

41 Claims, 5 Drawing Sheets

U.S. PATENT DOCUMENTS

| | | |
|---|---|---|
| 5,398,554 A | 3/1995 | Ogawa |
| 5,476,013 A | 12/1995 | Hussain |
| 5,531,126 A | 7/1996 | Drahm |
| 5,691,485 A | 11/1997 | Endo |
| 5,705,754 A | 1/1998 | Keita |
| 5,796,010 A | 8/1998 | Kishiro |
| 5,796,012 A | 8/1998 | Gomi |
| 5,945,609 A | 8/1999 | Kashimura |
| 5,969,265 A | 10/1999 | VanCleve |
| 5,979,246 A | 11/1999 | VanCleve |
| 6,006,609 A | 12/1999 | Drahm |
| 6,397,685 B1 | 6/2002 | Cook |
| 6,666,098 B2 | 12/2003 | Drahm |
| 6,691,583 B2 | 2/2004 | Reider |
| 6,840,109 B2 | 1/2005 | Drahm |
| 6,948,379 B2 | 9/2005 | Hussain |
| 7,040,179 B2 | 5/2006 | Drahm |
| 7,077,014 B2 | 7/2006 | Rieder |
| 2005/0139015 A1 | 6/2005 | Gebhardt |

FOREIGN PATENT DOCUMENTS

| | | |
|---|---|---|
| DE | 103 51 311 B3 | 6/2005 |
| DE | 10 2004 030 392 A1 | 1/2006 |
| EP | 0 317 340 A2 | 5/1989 |
| EP | 1 253 408 A1 | 10/2002 |
| EP | 1 260 798 A1 | 11/2002 |
| WO | WO 99/40394 A1 | 8/1999 |
| WO | WO 99/51946 | 10/1999 |
| WO | WO 00/14485 | 3/2000 |

OTHER PUBLICATIONS

U.S. Appl. No. 11/599,478.*

* cited by examiner

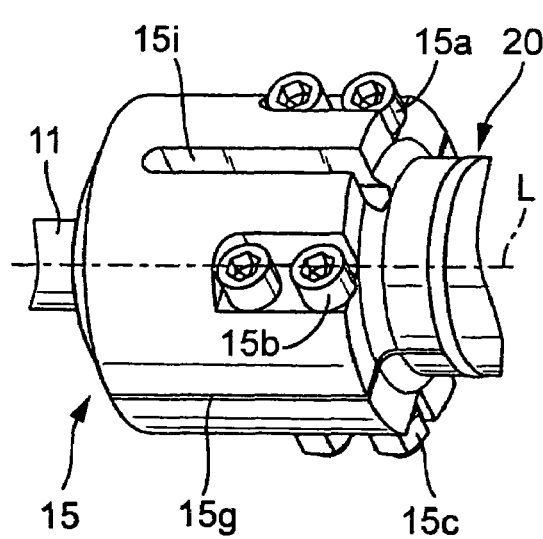 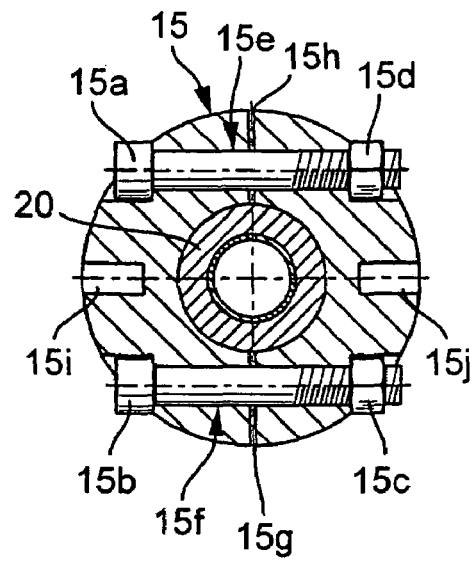
Fig. 7a  Fig. 7b
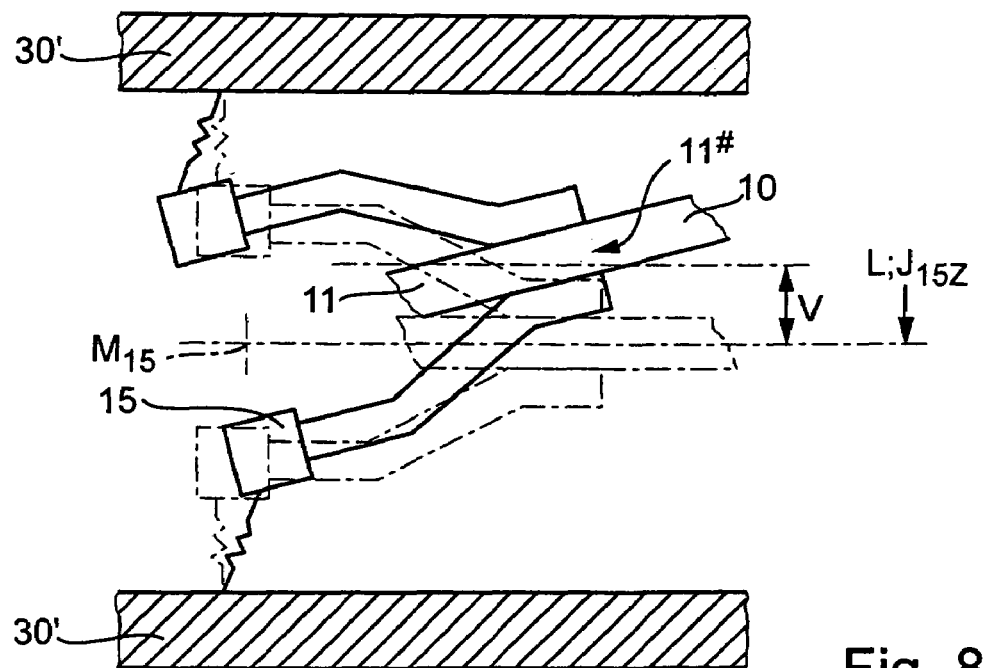
Fig. 8

MEASUREMENT TRANSDUCER OF VIBRATION-TYPE

This application is a nonprovisional application based on U.S. Provisional Application 60/736,855, filed on Nov. 16, 2005 and on U.S. Provisional Application 60/748,164 filed on Dec. 8, 2005; and priority is also claimed of German application 102005054855.5 filed on Nov. 15, 2005 and German application 102005058593.0 filed on Dec. 7, 2005.

FIELD OF THE INVENTION

The invention relates to a measurement transducer of vibration-type, especially one suited for use in a Coriolis mass-flow meter.

BACKGROUND OF THE INVENTION

For determining a mass flow of a medium, especially a liquid flowing in a pipeline, often such measuring devices are used, which by means of a measurement transducer of vibration-type and a control and evaluation electronics connected thereto, create Coriolis forces in the medium and produce, derived from these forces, a measurement signal representing the mass flow.

Such Coriolis mass-flow meters have been known for a long time and have established themselves well in industrial application. Thus, for example in EP-A 317 340, U.S. Pat. Nos. 5,398,554, 5,476,013, 5,531,126, 5,691,485, 5,705,754, 5,796,012, 5,945,609, 5,979,246, 6,006,609, 6,397,685, 6,691,583, 6,840,109, WO-A 99 51 946, WO-A 99 40 394 or WO-A 00 14 485, Coriolis mass-flow meters are described, each with a measurement transducer of vibration-type. Each of the disclosed measurement transducers includes a single, straight measuring tube, which conveys the medium and vibrates during operation. Such measuring tube communicates with the pipeline via an inlet tube piece at its inlet end and an outlet tube piece at its outlet end. Each of the disclosed measurement transducers also includes: An exciter mechanism, which causes the measuring tube during operation to oscillate with bending oscillations in a tube plane; and a sensor arrangement for the point-wise registration of oscillations toward the inlet end and toward the outlet end of the measuring tube.

As is known, straight measuring tubes, when excited to bending oscillations of a first eigenoscillation form, effect Coriolis forces in the medium flowing through the measuring tube. These forces, in turn, lead to a superimposing, on the excited bending oscillations, of coplanar bending oscillations of a second form of eigenoscillation of higher and/or lower order, such that oscillations registered on the inlet and outlet ends of the measuring tube exhibit also a measurable phase difference dependent on the mass flow.

Usually the measuring tubes of such measurement transducers, for example those used in Coriolis mass-flow meters, are excited during operation to an instantaneous resonance frequency of the first eigenoscillation form, especially in the case of controlled to constant oscillation amplitude. Since this resonance frequency is especially also dependent on the instantaneous density of the medium, it is possible also by means of Coriolis mass-flow meters common in the market to measure, besides mass flow, also the density of flowing media.

An advantage of straight measuring tubes is that; for example, they can be emptied with a high degree of certainty completely in practically any installation orientation. Especially is this also true after a cleaning process performed inline. Additionally, such measuring tubes are, in comparison e.g. to omega-shaped or helically-shaped measuring tubes, essentially easier and accordingly more cost-favorably manufacturable. A further advantage of a straight measuring tube vibrating in the above described manner is, in comparison to bent measuring tubes, also to be seen e.g. in the fact that, during measurement operations via the measuring tube, practically no torsional oscillations are evoked in the connected pipeline.

On the other hand, a significant disadvantage of the above-described measurement transducers lies in the fact that, because of the alternating lateral deflections of the vibrating, single measuring tube, oscillating transverse forces of the same frequency can be caused to act on the pipeline. To this point in time, these transverse forces have only been able to be compensated to a very limited extent and only with a very high technical effort.

For improving the dynamic balance of the measurement transducer, especially for reducing transverse forces caused by the vibrating, single measuring tube acting at its inlet and outlet ends on the pipeline, the measurement transducers disclosed in EP-A 317 340, U.S. Pat. Nos. 5,398,554, 5,531, 126, 5,691,485, 5,796,012, 5,979,246, 6,006,609, 6,397,685, 6,691,583, 6,840,109 or WO-A 00 14 485 include in each case a counteroscillator embodied as one or more pieces and affixed to the measuring tube on the inlet end, accompanied by the formation of a first coupling zone, and affixed to the measuring tube on the outlet end, accompanied by the formation of a second coupling zone. Such counteroscillators, which are implemented in the form of a beam or especially in tubular form or as a body pendulum aligned with the measuring tube, oscillate during operation out of phase with the measuring tube, especially with opposite phase, whereby the effect of the lateral transverse forces and/or transverse impulses brought about in each case by the measuring tube and the counteroscillator on the pipeline can be minimized and in some cases also completely suppressed.

Such measurement transducers with a single measuring tube and counteroscillator have proven themselves, especially in the case of those applications wherein the medium to be measured has an essentially constant density or a density which changes to only a very slight degree, thus, for those applications in which a net force acting on the attached pipeline, resulting from the transverse forces produced by the measuring tube and the counterforces produced by the counteroscillator, can initially be set, without more, assuredly to zero. In contrast, those measurement transducers, especially those disclosed in U.S. Pat. Nos. 5,531,126 or 5,969,265, in the case of applications with media having densities fluctuating over wide ranges, especially in the case of different media following one after the other, and even when to only a slight degree, exhibit practically the same disadvantage as measurement transducers without counteroscillators, since the above-mentioned net resultant forces are also dependent on the density of the medium and consequently can be different from zero to a considerable degree. Stated differently, also the inner part of the measurement transducer formed by at least the measuring tube and the counteroscillator is globally deflected during operation out of an assigned static rest position, due to density dependent imbalances and transverse forces associated therewith.

A possibility for reducing density dependent, transverse forces is described e.g. in U.S. Pat. Nos. 5,287,754, 5,705, 754, 5,796,010 or 6,948,379. In the case of the measurement transducers shown there, the more middle, or high, frequency, oscillatory, transverse forces produced on the part of the vibrating, single measuring tube are kept away from the pipeline by means of an, in comparison to the measuring tube, very heavy counteroscillator, and, as required, a relatively soft coupling of the measuring tube to the pipeline, thus, in practical terms, by means of a mechanical low pass filter. A great disadvantage of such a measurement transducer is, among other things, however, that the counteroscillator mass required for achieving a sufficiently robust damping increases more than proportionately with the nominal diameter of the measuring tube. On the other hand, when using such a massive counteroscillator, one must assure that a minimum eigenfrequency of the measurement transducer (which becomes ever lower with increasing mass) still lies far from the likewise very low eigenfrequencies of the attached pipeline.

Different, farther-reaching possibilities for reduction of the density dependent, transverse forces are proposed e.g. in U.S. Pat. Nos. 5,979,246, 6,397,685, 6,691,583, 6,840,109, WO-A 99 40 394 or WO-A 00 14 485. In the case of the disclosed compensation mechanisms presented there, of essential concern is the expanding of a bandwidth, within which counteroscillator and offset sections are effective, by providing a suitable interaction of the individual components of the inner parts of the measurement transducers.

In particular, in U.S. Pat. No. 6,397,685, a measurement transducer of the aforementioned kind is disclosed, wherein a first balancing mass is provided as a mass balancing measure for the exciting oscillation and is connected, in the compensation cylinder's central plane perpendicular to the longitudinal axis, with the compensation cylinder. Then, second and third balancing masses are provided as a mass balancing measure for the Coriolis oscillation. The second and third balancing masses are embodied as end regions of the counteroscillator. In this manner, it is to be achieved that the oscillation system composed of the Coriolis measuring tube and the compensation cylinder is at least largely balanced with respect to mass both for the exciting oscillations of the Coriolis measuring tube as well as also for the Coriolis oscillations of the Coriolis measuring tube.

WO-A 00 14 485 also describes a measurement transducer of vibration-type for a medium flowing in a pipeline. In this case, provided are: An inlet end, first cantilever, which is coupled with the measuring tube in the region of a third coupling zone lying between the first and second coupling zones and which has a center of mass lying in the region of the measuring tube; and an outlet end, second cantilever, which is coupled with the measuring tube in the region of a fourth coupling zone lying between the first and second coupling zones and which has a center of mass lying in the region of the measuring tube. Each of the two cantilevers is provided for executing balancing oscillations, which are so developed that the transverse impulses are compensated, and, consequently, a center of mass of an inner part formed of measuring tube, exciter mechanism, sensor arrangement and the two cantilevers is held locationally fixed. Furthermore, WO-A 99 40 394 describes a measurement transducer of the aforementioned kind in which a first cantilever serving for producing counterforces acting against the transverse forces at the inlet ends, as well as a second cantilever serving for producing counterforces acting against the transverse forces on the outlet end are provided. In such case, the first cantilever is affixed both to the measuring tube in the region of the first coupling zone and also to the transducer housing at the inlet end, and the second cantilever is affixed both to the measuring tube in the region of the second coupling zone, as well as also to the transducer housing on the outlet end, such that the counterforces are so developed that the measuring tube is kept fixed in an assigned, static rest position, despite the produced transverse forces.

In the case of the aforementioned measurement transducers, including that described in U.S. Pat. No. 5,979,246, the problem of density dependent imbalances is solved, in principle, by matching an amplitude characteristic of the counteroscillator to the measuring tube oscillations, especially by amplitude dependently changeable spring stiffnesses of the counteroscillator initially, and/or during operation, in such a manner that the forces produced by measuring tube and counteroscillator essentially compensate one another.

Finally, in U.S. Pat. Nos. 6,691,583 and 6,840,109, measurement transducers are in each case disclosed, wherein, in each case, a first cantilever fixed in the region of the first coupling zone essentially rigidly to the measuring tube, counteroscillator and inlet tube piece and a second cantilever fixed in the region of the second coupling zone essentially rigidly to the measuring tube, counteroscillator, and outlet tube piece are provided.

The two cantilevers, especially ones arranged symmetrically about the middle of the measuring tube, serve here for producing in the inlet and outlet tube pieces bending moments dynamically, when the vibrating measuring tube together with the counteroscillator and, as a result, also the two coupling zones are shifted laterally from their respectively assigned, static, rest positions, with the bending moments being so developed that, in the deforming inlet tube piece and in the deforming outlet tube piece, impulses are produced, which are directed counter to the transverse impulses produced in the vibrating measuring tube. The two cantilevers are so embodied and so arranged for this purpose in the measurement transducer that a center of mass of the first cantilever lying in the region of the inlet tube piece and a center of mass of the second cantilever lying in the region of the outlet tube piece both remain essentially locationally fixed in a static rest position despite the fact that the measuring tube has been shifted laterally out of its assigned static rest position. The basic principal of this compensation mechanism is to transform lateral displacement movements of the vibrating measuring tube, which would otherwise act in a disturbing manner on the measurements and/or on the connected pipeline and which are superimposed on its primary deformations effecting the measurement effects, into counter deformations of the inlet and outlet tube pieces acting in a dynamically balancing manner in the measurement transducer, in order to largely eliminate the lateral deflection movements. By a suitable tuning of the inner part, the deformations of the inlet and outlet tube pieces can be so developed that the transverse impulses largely compensate one another, independently of the instantaneous oscillation amplitudes and/or frequencies of the measuring tube. In corresponding manner, it is thus possible also essentially to compensate the transverse forces produced by the vibrating measuring tube by means of transverse forces produced by the deforming inlet tube piece and the deforming outlet tube piece.

Further investigations have, however, shown that, although with the decoupling mechanism proposed in U.S. Pat. Nos. 6,691,583 and 6,840,109, in principle, very good results are achievable with respect to disturbance resistance, the configurations disclosed there, nevertheless, exhibit bandwidths, which are too small for the decoupling mechanism and, as a result, may not yield satisfactory results with respect to the disturbance resistance of the measurement transducer when it comes to certain applications, especially in those applications involving medium densities fluctuating within very wide ranges. However, it was furthermore also possible to determine that alone the application of a relatively heavy counteroscillator as proposed in U.S. Pat. Nos. 5,287,754, 5,705, 754, 5,796,010 or 6,948,379 led to no clear improvements for the decoupling mechanism presented in U.S. Pat. Nos. 6,691,583 and 6,840,109.

SUMMARY OF THE INVENTION

An object of the invention, therefore, is to provide a measurement transducer of the aforementioned type, especially one suited for a Coriolis mass-flow meter or also for a Coriolis mass-flow/density meter, which is dynamically well balanced in operation over a wide range of media densities and in the case of which both measuring tube and also counteroscillator can in spite of this be of relatively a small mass.

For achieving the object, the invention resides in a measurement transducer of vibration-type for a medium flowing in a pipeline, wherein the measurement transducer includes: an essentially straight measuring tube, which vibrates, at least at times, during operation and which serves for conveying the medium, with the measuring tube communicating with the pipeline via an inlet tube piece at an inlet end and an outlet tube piece at an outlet end; and a counteroscillator, which is affixed to the measuring tube on the inlet end for forming a first coupling zone and to the measuring tube on the outlet end for forming a second coupling zone, whereby said first and second coupling zones imaginarily connected by a longitudinal axis of the measurement tube. Additionally, the measurement transducer includes a first cantilever for producing bending moments in the inlet tube piece, with the first cantilever being essentially rigidly coupled with the inlet tube piece and the measuring tube in the region of the first coupling zone and having a center of mass lying in the region of the inlet tube piece; as well as a second cantilever for producing bending moments in the outlet tube piece, with the second cantilever being essentially rigidly coupled with the outlet tube piece and the measuring tube in the region of the second coupling zone and having a center of mass lying in the region of the outlet tube piece. Furthermore, said first cantilever has a first mass moment of inertia about an imaginary first rotational axis lying in the first coupling zone, and said first cantilever has a second mass moment of inertia about an imaginary second axis of rotation lying essentially parallel to the longitudinal axis of the measuring tube, and a second cantilever for producing bending moments in the outlet tube piece. Analog to this, said second cantilever has a first mass moment of inertia about an imaginary second axis of rotation, lying in the second coupling zone and being essentially parallel to the first axis of rotation as well as said second cantilever has a second mass moment of inertia about an imaginary second axis of rotation lying essentially parallel to the longitudinal axis of the measuring tube.

According to an aspect of the invention, it is further provided that a ratio of a first mass moment of inertia of the first cantilever about an imaginary first rotational axis of the first cantilever lying in the first coupling zone, to a second mass moment of inertia of the first cantilever about an imaginary second rotational axis of the first cantilever essentially parallel to the longitudinal axis of the measuring tube is smaller than 5 and especially smaller than 2. According to another aspect of the invention, it is provided that also a ratio of a first mass moment of inertia of the second cantilever about an imaginary first rotational axis of the second cantilever lying in the second coupling zone and essentially parallel to the first rotational axis of the first cantilever, to a second mass moment of inertia of the second cantilever about an imaginary second rotational axis of the second cantilever essentially parallel to the longitudinal axis of the measuring tube is smaller than 5, especially smaller than 2. According to a further aspect of the invention, it is provided that each of the two first mass moments of inertia amount to at least 0.01 kg·m$^2$ and/or that each of the two second mass moments of inertia amount to at least 0.01 kg·m$^2$. According to another aspect of the invention, it is further provided that a quotient of the first mass moment of inertia of each cantilever to its particular mass is smaller than 0.03 m$^2$ and lies especially in a range between 0.001 m$^2$ and 0.01 m$^2$. Further, it is provided that a ratio of this aforementioned quotient of the respective cantilever to a cross sectional area of the measuring tube is smaller than 10.

In a first embodiment of the invention, it is provided that each of the two cantilevers has a mass which is greater than 1.5 times the mass of the counteroscillator. In a further development of the invention, it is provided that each of the two cantilevers has a mass, which is smaller than 5 times the mass of the counteroscillator and, especially, not greater than 3 times the mass of the counteroscillator.

In a second embodiment of the invention, it is provided that the mass of the counteroscillator is at least 5 times the mass of the measuring tube.

In a third embodiment of the invention, it is provided that each of the two cantilevers has a mass, which is at least one times the mass of the measuring tube.

In a fourth embodiment of the invention, it is provided that a length of the cantilever is at most 0.9 times the length of the inlet tube piece or the outlet tube piece.

In a fifth embodiment of the invention, it is provided that each of the two cantilevers is constructed essentially tubularly or with shell shape. In a further development of this embodiment, it is further provided that each of the cantilevers has a greatest wall thickness, which is greater than a greatest wall thickness of the counteroscillator. Further, it is provided that each of the cantilevers has a smallest wall thickness, which is greater than a greatest wall thickness of the counteroscillator.

In a sixth embodiment of the invention, it is provided that the measuring tube inlet and outlet tube pieces are, in each case, formed by segments of a single, one-piece tube.

In a seventh embodiment of the invention, it is provided that the measuring tube is essentially straight. In a further development of this embodiment of the invention, it is further provided that the counteroscillator, likewise, is straight and that the measuring tube and the counteroscillator are essentially directed coaxially with one another. According to another further development of this embodiment of the invention, it is further provided that each of the cantilevers has a length, which is at most 0.5 times a length of the measuring tube, especially each of the cantilevers has, in such case, a length, which is smaller than 0.4 times a length of the measuring tube.

In an eighth embodiment of the invention, it is provided that the measuring tube is at least partially surrounded by the counteroscillator.

In a ninth embodiment of the invention, it is provided that also the counteroscillator is tubular.

In a tenth embodiment of the invention, it is provided that the counteroscillator has an inner diameter of more than 50 mm and/or a wall thickness of more than 5 mm.

In an eleventh embodiment of the invention, it is provided that the inlet tube piece and the outlet tube piece are essentially straight. In another further development of this embodiment of the invention, the measuring tube executes during operation, at least at times, bending oscillations about a bending oscillation axis essentially parallel to, especially coinciding with, the longitudinal axis of the measuring tube. Further, it can be provided that the measuring tube executes, during operation, at least at times, torsional oscillations about a torsional oscillation axis essentially parallel to, especially coinciding with, the longitudinal axis of the measuring tube.

In a twelfth embodiment of the invention, it is provided that a length of the inlet tube piece as well as the length of the outlet tube piece each corresponds at most to 0.5 times a length of the measuring tube. In a further development of this embodiment of the invention, it is further provided that the inlet tube piece as well as the outlet tube piece both have a length, which is in each case smaller than 0.5 times a length of the measuring tube.

In another further development of this embodiment of the invention, it is provided that the measuring tube, during operation, at least at times, vibrates with an oscillation frequency, which, taking into consideration a length of the inlet tube piece as well as a bending stiffness of the inlet tube piece, is greater than $$\frac{1}{2\pi} \cdot \sqrt{\frac{12 \cdot E_{11} \cdot I_{11} / L_{11}^3}{m_{15}}},$$

wherein $L_{11}$ represents the length of the inlet tube piece, $m_{15}$ the mass of the first cantilever, and $E_{11} \cdot I_{11}$ a bending stiffness of the inlet tube piece, as determined by the modulus of elasticity $E_{11}$ of the material of the inlet tube piece, as well as an axial, areal moment of inertia $I_{11}$ of the inlet piece. Additionally, also the measuring tube, when filled with water, has a lowest natural eigenfrequency, which is greater than $$\frac{1}{2\pi} \cdot \sqrt{\frac{12 \cdot E_{11} \cdot I_{11} / L_{11}^3}{m_{15}}}.$$

In a thirteenth embodiment of the invention, it is provided that the empty measuring tube has a lowest natural eigenfrequency, which is greater than or about equal to a lowest natural eigenfrequency of the counteroscillator. In a further development of this embodiment of the invention, it is further provided that a lowest natural eigenfrequency also of the measuring tube filled with water corresponds at least to 1.1 times a lowest natural eigenfrequency of the counteroscillator.

In a fourteenth embodiment of the invention, it is provided that inlet tube piece, outlet tube piece, and measuring tube are essentially straight and that a length of the inlet tube piece, as well as a length of the outlet tube piece, corresponds in each case at most to 0.5 times a length of the measuring tube. In a further development of this embodiment of the invention, it is additionally provided that both the inlet tube piece and the outlet tube piece have a length, which is in each case smaller than 0.4 times a length of the measuring tube.

In a fifteenth embodiment of the invention, that that each of the two cantilevers has a mass, which is at least equal to the mass of the counteroscillator and/or In a sixteenth embodiment of the invention, it is provided that each of the cantilevers is, at least in part, immediately affixed to the counteroscillator.

In a seventeenth embodiment of the invention, it is provided that each of the cantilevers is formed by means of a sleeve inserted onto the counteroscillator. In a further development of this embodiment of the invention, it is provided that each of the sleeves forming the cantilevers has, in each case, at least one annular groove. Further, it is provided that the at least one annular groove of either of the two cantilevers is directed essentially coaxially, especially concentrically, with a principal axis of inertia of the particular cantilever.

In an eighteenth embodiment of the invention, the measuring tube has an inner diameter of more than 40 mm and/or a wall thickness of more than 2 mm.

In a nineteenth embodiment of the invention, it is provided that the measurement transducer further includes a sensor arrangement for registering oscillations at least of the measuring tube.

In a twentieth embodiment of the invention, it is provided that the measurement transducer further includes an exciter mechanism for driving at least the measuring tube.

In a twenty-first embodiment of the invention, it is provided that the measuring tube vibrates, at least at times, with an oscillation frequency which corresponds at least to 1.5 times a lowest natural eigenfrequency of an oscillatable inner part of the measurement transducer formed at least by means of the measuring tube, the counteroscillator, the inlet tube piece, the outlet tube piece, as well as the two cantilevers. In a further development of this embodiment of the invention, it is provided that the lowest natural eigenfrequency of the inner part essentially is determined by the masses of the cantilevers, the measuring tube, and the counteroscillator, as well as an effective bending stiffness of the inlet and outlet tube pieces, which acts against such deformations of the inlet and outlet tube pieces resulting from lateral displacements of the coupling zones from respective static rest positions and twistings of the cantilevers accompanying such about their respective centers of mass.

In a twenty-second embodiment of the invention, it is provided that each cantilever has at least one longitudinal groove.

In a twenty-third embodiment of the invention, it is provided that each of the cantilevers is affixed to the counteroscillator by means of threaded connections.

Moreover, the invention resides in an inline measuring device embodied, for example, as a Coriolis mass flow measuring device, density measuring device, viscosity measuring device, or the like, for measuring and/or monitoring at least one parameter, for example, a mass flow, a density and/or a viscosity of a medium flowing in a pipeline, in which inline measuring device a measurement transducer of the above-defined type is used.

An advantage of the invention is that by an, especially in comparison to the heavy counteroscillators proposed in U.S. Pat. Nos. 5,287,754, 5,705,754, 5,796,010 or 6,948,379, slight increase of the mass of the inner part, considerable improvements in the balance of the measurement transducer and, as a result, also its disturbance resistance, can be achieved. The measurement transducer of the invention is distinguished by its being very disturbance resistant, also relative to disturbing oscillations possibly coupled in via a connected pipeline. It has been found additionally that such a measurement transducer can have a significantly lower mass e.g. compared to a measurement transducer whose inner transverse forces are compensated in comparable quality by means of the simple mechanical low pass system mentioned in U.S. Pat. Nos. 5,287,754, 5,705,754, 5,796,010 or 6,948, 379. Additionally, it can be embodied very compactly due to the dynamic oscillatory uncoupling. Therefore, the measurement transducer is suited especially also for measurements in pipelines having nominal diameters e.g. greater than 50 mm.

Nevertheless, the measurement transducer is also well suited for measurements in pipelines having a nominal diameter of 40 mm or smaller.

BRIEF DESCRIPTION OF THE DRAWINGS

The invention and further advantages will now be explained on the basis of an example of an embodiment illustrated in the figures of the drawing. Equal parts are provided in the figures with equal reference characters. Should it be advantageous from the point of view of clarity, already mentioned reference characters are omitted in subsequent figures. The figures of the drawing show as follows:

FIGS. 7a, b schematically an example of an embodiment for an cantilever of a measurement transducer according to FIG. 2; and FIG. 8 schematically, a detail of the measurement transducer with measuring tube vibrating according to FIG. 6c).

DETAILED DESCRIPTION OF EXEMPLARY EMBODIMENTS

Figure 1:
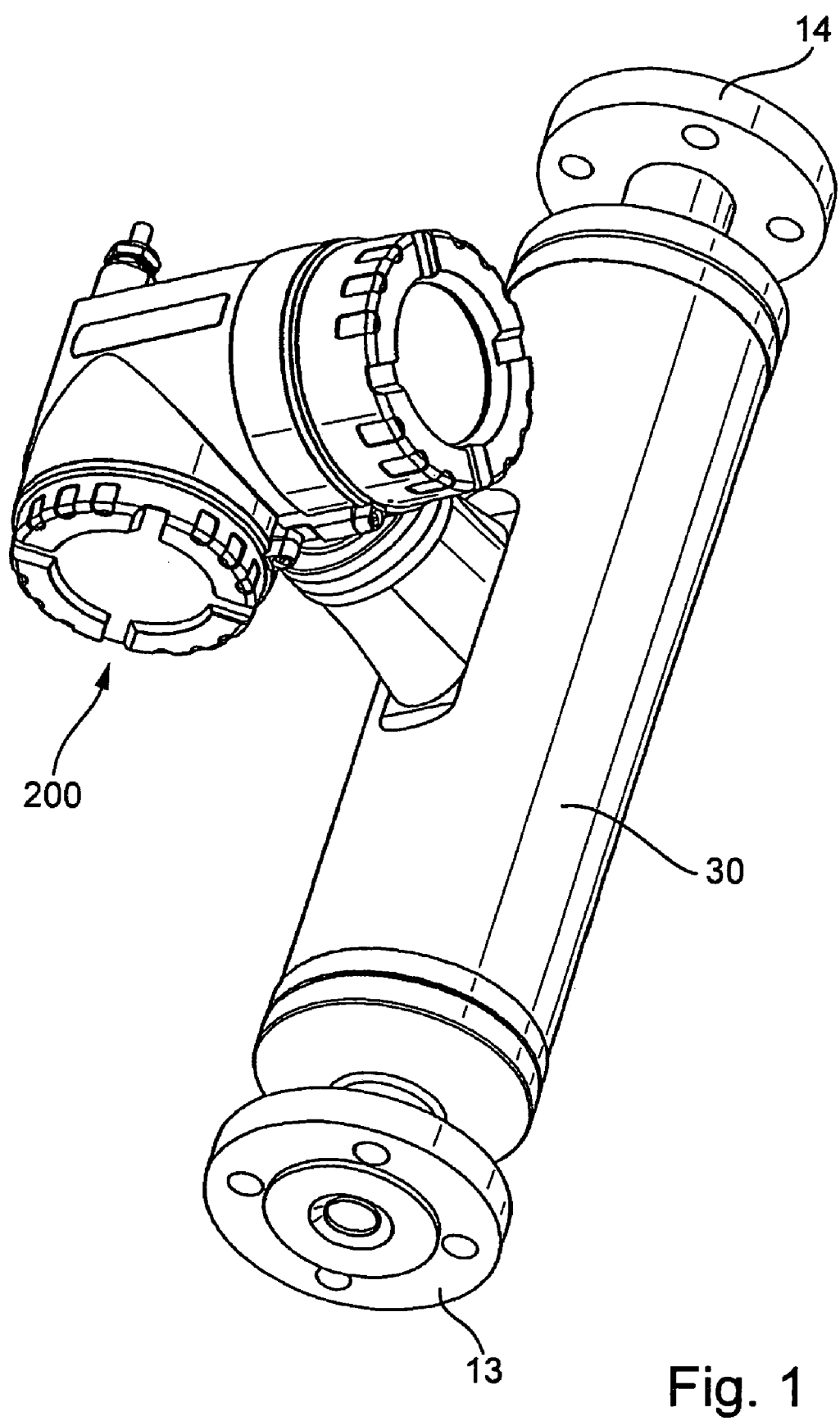
FIG. 1 an inline measuring device insertable into a pipeline for measuring at least one parameter of a medium conveyed in the pipeline.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Shown in FIG. 1 is an inline measuring device insertable into a pipeline, for example, as a Coriolis mass flow measuring device, a density measuring device, a viscosity measuring device, or the like, which serves for measuring and/or monitoring at least one parameter, for example, a mass flow rate, a density, a viscosity, etc., of a medium flowing in the pipeline. The inline measuring device includes for such purpose a measurement transducer of vibration-type, through which the medium to be measured flows during operation. FIGS. 2-5 schematically show corresponding examples of embodiments of such measurement transducers of vibration-type. Moreover, the principal mechanical construction as well as its manner of operation are comparable with those of the measurement transducers disclosed in U.S. Pat. Nos. 6,691,583 or 6,840,109. The measurement transducer serves for producing, in the medium flowing therethrough, mechanical reaction forces, e.g. mass flow dependent, Coriolis forces, density dependent, inertial forces, and/or viscosity dependent, frictional forces, which react measurably, especially sensorially registerably on the measurement transducer. Derived from these reaction forces, e.g. a mass flow rate m, a density $\rho$ and/or a viscosity $\eta$ of the medium can be measured in the manner known to those skilled in the art.

For the conveying of the medium, the measurement transducer includes here a single, essentially straight, measuring tube, which is caused to vibrate during operation, and, as a result, is repeatedly elastically deformed as it oscillates about a static, rest position.

For minimizing disturbing influences acting on the measuring tube, as well as for reducing the transfer of oscillatory energy from the measurement transducer to the connected pipeline, there is additionally provided in the measurement transducer a counteroscillator 20 extending in this case essentially parallel to the measuring tube 10. This is, as shown in FIG. 3, affixed to the measuring tube 10, such that there is formed at the inlet side at a first coupling zone 11# and at the outlet side a second coupling zone 12#. The first and second coupling zones define, for practical purposes, respectively, an inlet end of the measuring tube 10 and an outlet end of the measuring tube 10. The counteroscillator 20 can be of tubular form or box shape and can be connected with the measuring tube, for example, in such a way at the inlet end and at the outlet end that it is directed essentially coaxially with the measuring tube 10, such as is shown by a comparison of FIGS. 2 and 3, whereby the counteroscillator 20 surrounds the measuring tube 10. Additionally, the counteroscillator 20 is designed in the present example of an embodiment to be significantly heavier than the measuring tube 10.

For enabling the medium to be measured to flow through the measuring tube, the measuring tube 10 is connected to the pipeline (not shown), which brings the medium and then carries it away, via an inlet tube piece 11 at the inlet end in the region of the first coupling zone and via an outlet tube piece 12 at the outlet end in the region of the second coupling zone. The outlet tube piece 12 may, especially, be essentially identical to the inlet tube piece 11. Inlet tube piece 11 and outlet tube piece 12 are essentially straight in the illustrated example of an embodiment and are directed in alignment with one another, with the measuring tube 10 and with an imaginary longitudinal axis L of the transducer imaginary connecting the coupling zones. In case of an essentially straight measuring tube the longitudinal axis L of the transducer may advantageously coincide with an imaginary longitudinal axis of the measuring tube.

According to an embodiment of the invention, a length, $L_{11}$, of the inlet tube piece 11, as well as a length, $L_{12}$, of the outlet tube piece 12, are in each case at most 0.5 times a length, $L_{10}$, of the measuring tube 10. In order to be able to provide a measuring transducer which is as compact as possible, both the inlet tube piece 11 and the outlet tube piece 12 have their respective lengths, $L_{11}$ and $L_{12}$, smaller, in each case, than 0.4 times a length, $L_{10}$, of the measuring tube 10.

In advantageous manner, measuring tube 10, inlet tube piece 11, and outlet tube piece 12 can be embodied as one piece, so that e.g. a single tubular stock can serve for their manufacture. Instead of this, that measuring tube 10, inlet tube piece 11 and outlet tube piece 12 are formed, in each case, by segments of a single, one-piece tube, these can, if required, also be manufactured by means of single, subsequently joined together, pieces of stock, for instance, pieces of stock joined subsequently by welding.

Figure 2:
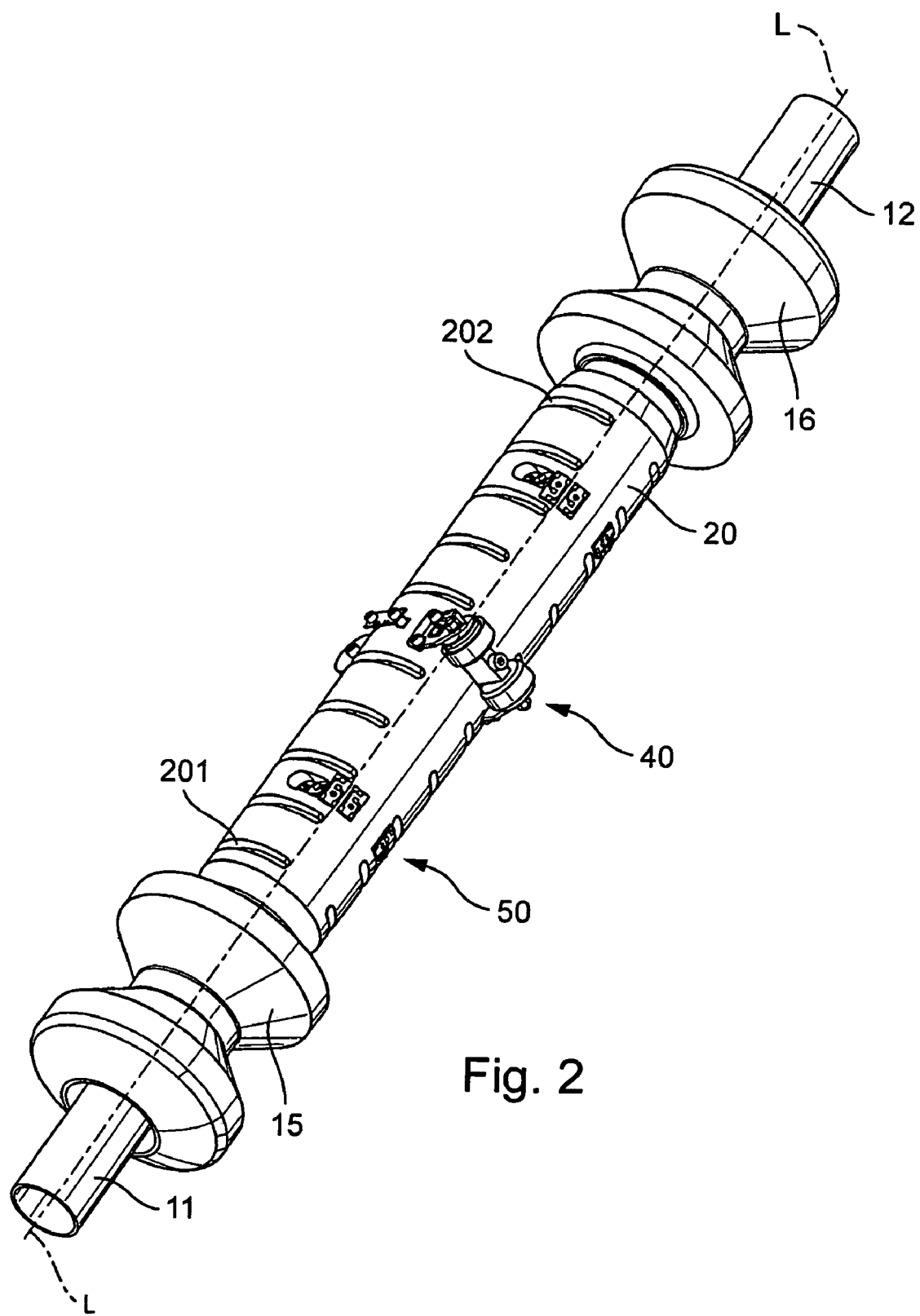
FIG. 2 an example of an embodiment for a measurement transducer of vibration-type suited for the inline measuring device according to FIG. 1 as shown in a perspective side view, said measurement transducer including a measuring tube, a counteroscillator, an inlet side cantilever and an outlet side cantilever.
Figure 3:
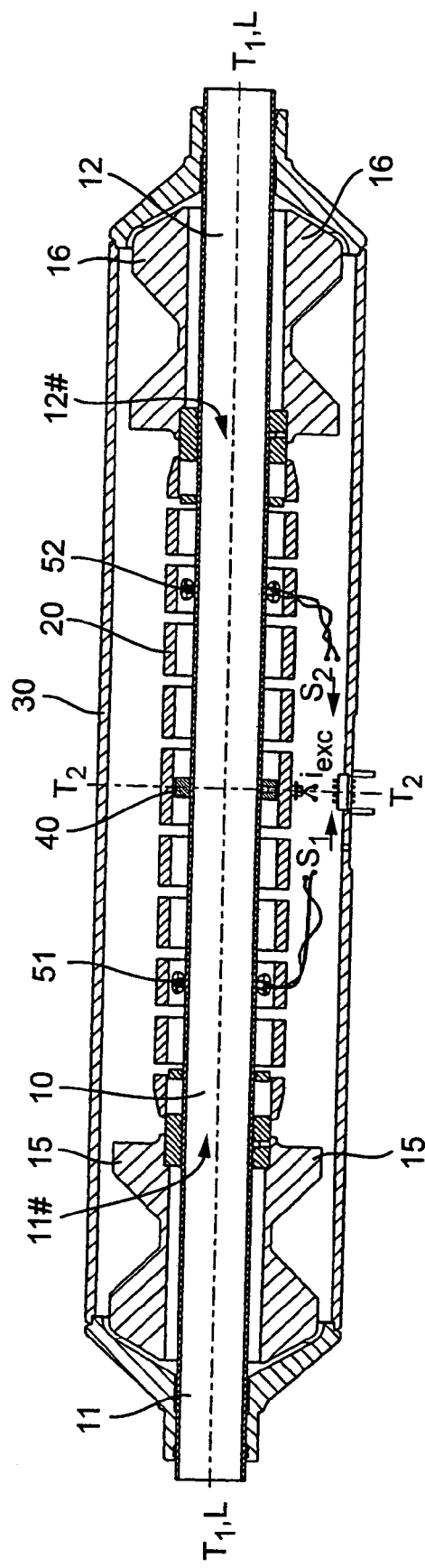
FIG. 3 a measurement transducer according to FIG. 2 sectioned in a side view.
Figure 5:
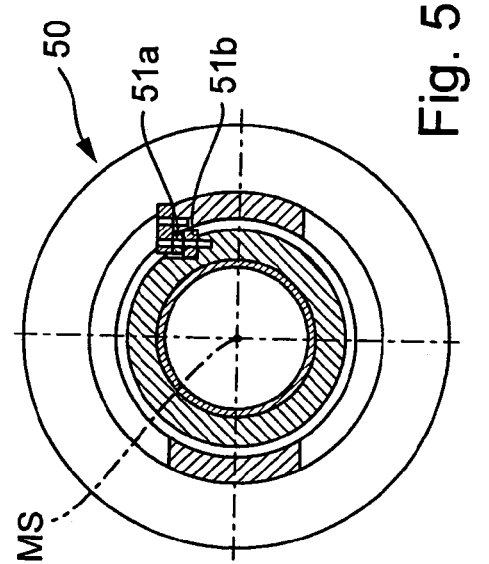
FIG. 5 a measurement transducer according to FIG. 2 in a second cross section.

As shown schematically in FIGS. 2 and 3, the measurement transducer of the invention further includes a first cantilever 15 coupled in the region of the first coupling zone with the inlet tube piece 11 and the measuring tube 10 and having a center of mass $M_{15}$ lying in the region of the inlet tube piece 11, as well as a second cantilever 16 coupled in the region of the second coupling zone with the outlet tube piece 12 and the measuring tube 10 and having a center of mass $M_{16}$ lying in the region of the outlet tube piece 12. In other words, the two essentially equally constructed, especially as required, even identical cantilevers 15, 16 are so arranged in the measurement transducer that the respective centers of mass $M_{15}$, $M_{16}$, are spaced from the measuring tube 10, especially lying, respectively, in line therewith. The two cantilevers 15 and 16 are thus, as a result, mounted eccentrically on the inlet and outlet tube pieces and, correspondingly, eccentrically also on measuring tube 10 and counteroscillator 20.

In a further embodiment of the invention, the cantilever 15 is so formed and attached to the measuring tube 10 that its center of mass $M_{15}$ lies essentially in a region of a half length of the inlet tube piece 11 and the cantilever 16 is so formed and attached to the measuring tube 10 that its center of mass $M_{16}$ lies essentially in a region of a half length of the outlet tube piece 12. In order to obtain as compact a measurement transducer as possible, an embodiment of the invention provides that each of the cantilevers 15, 16 is so constructed that a length, $L_{15}$, $L_{16}$, of the same corresponds, at most, respectively, to 0.9 times a length, $L_{11}$, of the inlet tube piece 11 and a length, $L_{12}$, of the outlet tube piece 12 and/or, at most, to 0.5 times a length, $L_{10}$, of the measuring tube 10. Especially, each of the cantilevers 15, 16 is further so embodied that the length of each is, in such case, also, as much as possible, smaller than 0.4 times the length, $L_{10}$, of the measuring tube 10.

The inner part of the measurement transducer formed by the measuring tube 10, the counteroscillator 20, the inlet tube piece 11, the outlet tube piece 12, as well as the two cantilevers 15, 16, is, as evident from a comparison of FIGS. 1 and 3, further held oscillatibly in a transducer housing 30 surrounding the inner part tightly against escape of medium and largely pressure tightly, as well. Transducer housing 30 is correspondingly affixed to the ends of the inlet and outlet tube pieces 11, 12 far from the coupling zones. For the case in which the measurement transducer is to be mounted releasably with the pipeline, first and second flanges 13, 14 are, in each case, formed on the inlet tube piece 11 and the outlet tube piece 12. The flanges 13, 14 can, in such case, at the same time, also be embodied as integral components of the transducer housing 30. In case required, the inlet and outlet tube pieces 11, 12 can, however, also be connected directly with the pipeline, e.g. by means of welding or brazing.

For producing the individual components of the aforementioned inner part, practically any usual material used for such measurement transducers such as e.g. steel, titanium, tantalum, zirconium, etc., or also appropriate combinations of these materials can be used. For example, use of titanium for measuring tube 10 as well as for the inlet tube piece 11 and the outlet tube piece 12, has proven to be especially suitable. While, for example, for reasons of cost savings, both for the counteroscillator 20 and the cantilever 15, 16, as well as also for the transducer housing 30, use of steel is of advantage. In order to enable as simple as possible and cost-favorable manufacture of the cantilevers, as well as, finally, the measurement transducer, each of the two cantilevers 15, 16 can, for example, be embodied essentially tubularly or sleeve-shaped, so that they can be formed essentially by means of sleeves, especially metal sleeves, inserted onto the counteroscillator, especially for the case when the counteroscillator 20 has already been connected with the measuring tube. According to a further development of such, each of the sleeves forming in such case the respective cantilevers 15, 16 has at least one annular groove. As is evident from a comparison of FIGS. 2 and 3, each of the, at least two, annular grooves in the case of the present example of an embodiment is oriented essentially coaxially, especially concentrically, with a principle axis of inertia of the respective cantilevers 15, 16 extending essentially parallel to the longitudinal axis L of the measuring tube. Alternatively to the use of the aforementioned sleeves for the cantilevers 15, 16, these can, however, also be manufactured together with the counteroscillator 20 as one piece by means of a single tubular stock or by means of two tube halves in a two-piece embodiment.

Figure 6A:
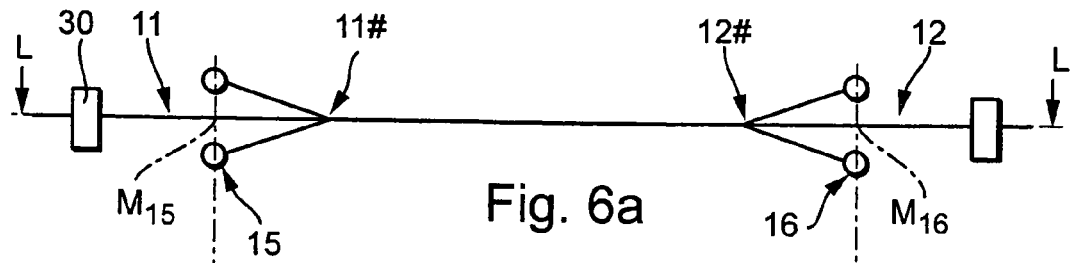
FIGS. 6 a) to d), schematically, bending lines of the measuring tube and a counteroscillator oscillating in a lateral bending oscillation mode.
Figure 6B:
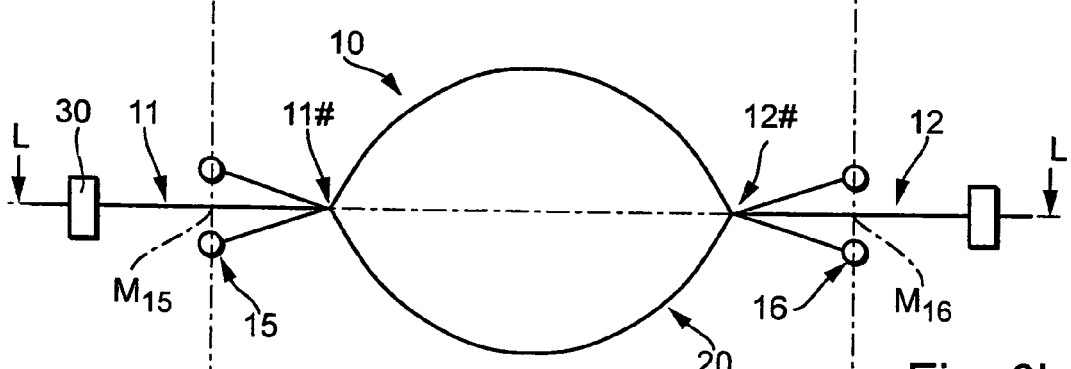
Figure 6C:
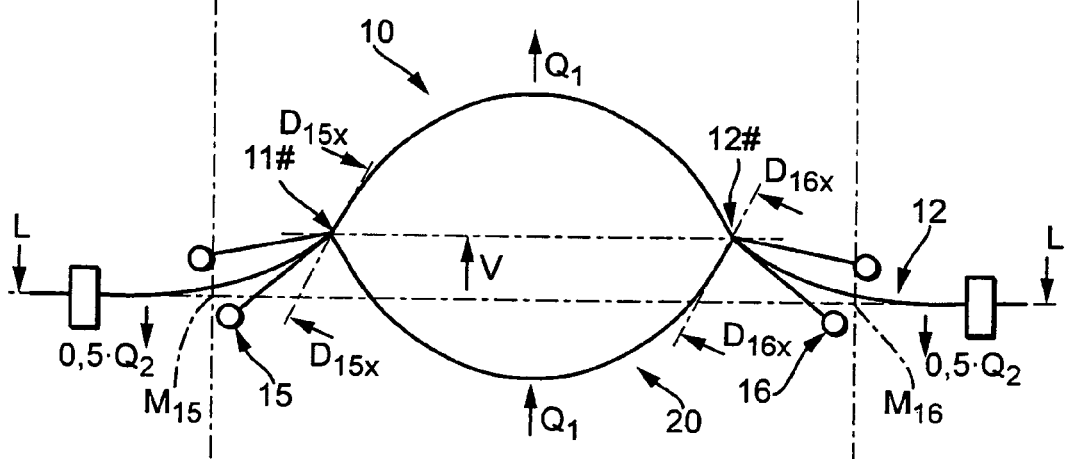
Figure 6D:
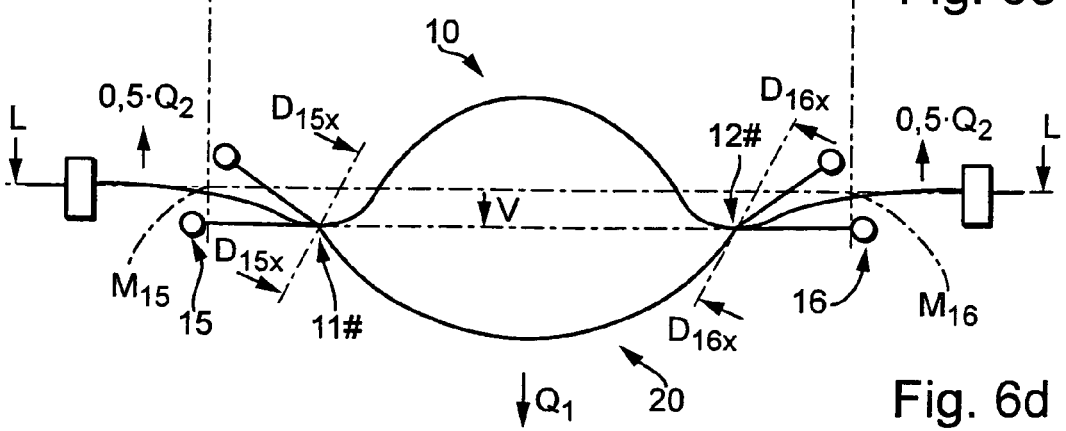

In operation of the measurement transducer, the measuring tube 10, as already mentioned at the beginning, is so excited, at least at times, to lateral bending oscillations, especially in the region of a natural resonance frequency, that it flexes in this so-called wanted mode essentially according to a natural first form of eigenoscillation. The bending oscillations are in such case essentially transverse to a bending oscillation axis essentially parallel with, especially coinciding with, the longitudinal axis L of the measuring tube. In an embodiment of the invention, the measuring tube 10 is in such case excited with an oscillation frequency, $f_{exc}$, which corresponds as accurately as possible to a natural resonance frequency of the so-called f1-eigenmode of the measuring tube 10, thus, a symmetric eigenmode, in which, as schematically shown in FIGS. 6b through 6d, the vibrating measuring tube 10, which, however, does not have medium flowing through it, is essentially symmetrically deflected with respect to a central axis perpendicular to the longitudinal axis, and, in such case, has essentially a single oscillation antinode. Equally, also the counteroscillator 20 is, as shown schematically in FIG. 6b also excited during operation of the measurement transducer likewise to bending oscillations, which are developed essentially coplanarally, however, in essentially opposite phase to the bending oscillations of the measuring tube 10. For the case in which the medium is flowing in the pipeline and consequently the mass flow rate is different from zero, Coriolis forces are induced in the medium flowing through the tube, by means of the measuring tube 10 vibrating in the aforementioned manner. These forces in turn react on the measuring tube 10 and thus cause an additional, sensorially registerable deformation (not, however, shown here) of the measuring tube 10 according to a natural second form of eigenoscillation, which is essentially coplanarally superimposed on the excited wanted mode. The instantaneous character of the deformation of the measuring tube 10 is in such case, especially as regards its amplitudes, also dependent on the instantaneous mass flow m. Serving as the second eigenoscillation form, the so-called Coriolis mode can be, as usual in the case of such measurement transducers, e.g. the eigenoscillation form of the antisymmetric f2-eigenmode; thus, that with two oscillation antinodes and/or the eigenoscillation form of the antisymmetric f4-eigenmode having four oscillation antinodes.

According to an embodiment of the invention, furthermore, measuring tube 10 and counteroscillator 20 are so dimensioned that the empty measuring tube 10 has a lowest natural eigenfrequency, $f_{10}$, which is greater than or about equal to a lowest natural eigenfrequency, $f_{20}$, of the counteroscillator 20. Especially, measuring tube 10 and counteroscillator 20 are, in such case, so dimensioned that the measuring tube, 10 when filled with water, has a lowest natural eigenfrequency, $f_{10, H2O}$, which is at least equal to a lowest natural eigenfrequency, $f_{20}$, of the counteroscillator 20. According to another embodiment of the invention, it is further provided that measuring tube 10 and counteroscillator 20 are so tuned to one another as regards their oscillation characteristics that a lowest natural eigenfrequency, $f_{10, H2O}$, of the measuring tube 10 corresponds also then at least to 1.1 times a lowest natural eigenfrequency, $f_{20}$, of the counteroscillator 20 when it is completely filled with water. In the case of a measuring tube 10 of titanium having a nominal diameter DN of about 55 mm, a length, $L_{10}$, of about 570 mm and a wall thickness of about 2.5 mm, a natural resonance frequency, $f_{10, Air}$, of the f1-eigenmode of the empty measuring tube would lie at about 550 Hz, while a natural resonance frequency, $f_{10, H2O}$, of the f1-eigenmode of the measuring tube filled with water would amount to about 450 Hz.

According to a further embodiment of the invention, measuring tube 10 and counteroscillator 20 are further so dimensioned for such purpose that a mass, $m_{20}$, of the counteroscillator 20 corresponds at least to 5-times a mass, $m_{10}$, of the measuring tube 10. In the case of a tube made of steel having an outer diameter of about 100 mm and a wall thickness of about 10 mm and taking into consideration the measuring tube dimensioned in the aforementioned manner, the counteroscillator 20 would have a mass, $m_{20}$, in the order of magnitude of about 10 kg.

In a further development of the invention, the measuring tube 10, especially in the case of a measurement transducer fashioned as shown in U.S. Pat. No. 6,840,109, executes, during operation, at least at times, torsional oscillations about a torsional oscillation axis essentially parallel with, especially coinciding with, the longitudinal axis L. Torsional oscillation axis, bending oscillation axis, as well as also the longitudinal axis L, can coincide, this being quite usual in the case of such measurement transducers. For the above described measuring tube 10, for example, a lowest natural resonance frequency for the torsional oscillations would lie in the region of about 750 Hz.

For producing mechanical oscillations of the measuring tube 10, be they bending oscillation and/or torsional oscillations, the measurement transducer further includes an exciter mechanism 40, especially an electrodynamic exciter mechanism. This serves for converting the exciter energy $E_{exc}$, fed from a control electronics (not shown) having a controlled current and/or a controlled voltage, into an exciter force $F_{exc}$, acting on the measuring tube 10 e.g. as pulses or harmonically, and elastically deforming measuring tube 10 in the aforementioned manner. The exciter force $F_{exc}$ can, in such case, as shown schematically in FIG. 4, be developed bidirectionally or, however, also only unidirectionally, and can, in the manner known to those skilled in the art, for instance by means of a current and/or voltage control circuit, be adjusted with respect to its amplitude and, e.g. by means of a phase-control loop, with respect to its frequency.

The exciter mechanism can be e.g. a simple solenoid arrangement acting differentially on the measuring tube 10 and the counteroscillator 20, with a cylindrical exciter coil attached to the counteroscillator 20 and through which a corresponding exciter current flows during operation and with a permanent magnet armature plunging at least partly into the exciter coil and being fixed externally, especially centrally, to the measuring tube 10. Additionally, the exciter mechanism 40 can e.g. be implemented as an electromagnet or as e.g. shown in WO-A 99 51 946, is a seismic exciter. For detecting oscillations of the measuring tube 10 e.g. a sensor arrangement usual for such measurement transducers can be used, in the case of which, in manner known to those skilled in the art, by means of an inlet side, first sensor 50A and by means of an outlet side, second sensor 50B, the movements of the measuring tube 10 are registered and converted into corresponding first and second sensor signals $S_1$, $S_2$, Used as sensors 50A and 50B can be e.g. electrodynamic velocity sensors differentially measuring the oscillations relative to the counteroscillator, or electrodynamic path sensors or acceleration sensors. Instead of electrodynamic sensor arrangements or in supplementation of the same, further sensors measuring by means of resistive or piezoelectric strain gauges or optoelectronic sensors can serve for detecting the oscillations of the measuring tube 10.

Figure 4:
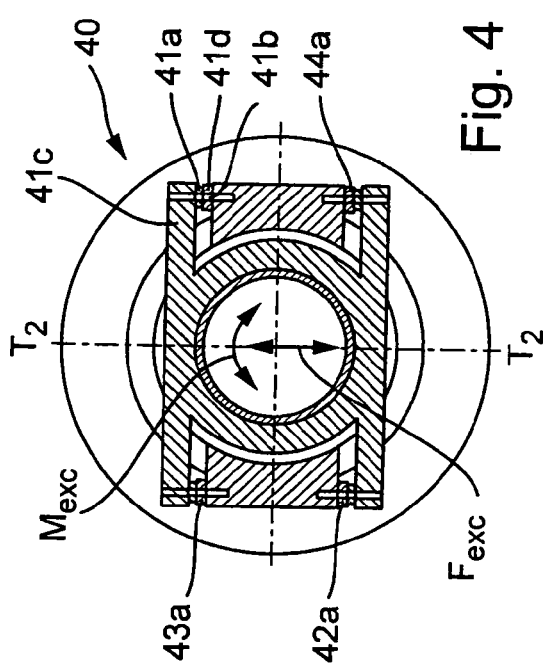
FIG. 4 a measurement transducer according to FIG. 2 in a first cross section.

In a further embodiment of the invention, the exciter mechanism 40 is, as also shown in FIGS. 2 to 4, so constructed and so arranged in the measurement transducer that the exciter mechanism 40 acts during operation simultaneously, especially differentially, on both measuring tube 10 and counteroscillator 20. In the example of an embodiment shown in FIG. 4, the exciter mechanism 40 has for such purpose at least a first exciter coil 41a, which in operation is flowed through, at least at times, by the exciter current or an exciter current component. Exciter coil 41 is affixed to a lever 41c connected with the measuring tube 10. Via the lever and an armature 41b affixed externally to the counteroscillator 20, exciter mechanism 40 acts differentially on the measuring tube 10 and the counteroscillator 20. This arrangement has, among other things, also the advantage that, on the one hand, the counteroscillator 20 and, consequently, also the transducer housing 100 can be kept small in crossection and, in spite of this, the exciter coil 41a is easily accessible, especially also during assembly. Moreover, another advantage of this embodiment of the exciter mechanism 40 lies in the fact that possibly used coil cups 41d, especially ones no longer negligibly heavy at nominal widths of above 50 mm, are likewise affixable to the counteroscillator 20 and, therefore, have practically no influence on the resonance frequencies of the measuring tube 10. It is to be noted, however, here that, in case required, the exciter coil 41a can also be held by the counteroscillator 20 and in such case the armature 41b is held on the measuring tube 10.

In corresponding manner, also the sensor arrangement 50 can be so designed and arranged in the measurement transducer that it registers the vibrations of measurement tube 10 and counteroscillator 20 differentially. In the example of an embodiment shown in FIG. 5, the sensor arrangement 50 includes a sensor coil 51a affixed to the measuring tube 10 and arranged here outside of all principle axes of inertia of the sensor arrangement 50. Sensor coil 51a is arranged as close as possible to an armature 51b affixed to the counteroscillator 20 and is so magnetically coupled with this that a variable measurement voltage is induced in the sensor coil as a function of rotational and/or lateral, relative movements between measuring tube 10 and counteroscillator 20 changing their relative position and/or their relative separation. On the basis of such an arrangement of the sensor coil 51a, it is possible, in advantageous manner, to register simultaneously both the aforementioned torsional oscillations, as well as also the possibly excited bending oscillations. In case required, the sensor coil 51a can, for such purpose, however, also be affixed to the counteroscillator 20 and in corresponding manner the armature 51b coupled therewith is then affixed to the measuring tube 10.

As already mentioned above a number of times, in the case of an exciting of the wanted mode vibrating in the above described manner in the single measuring tube 10, accompanying transverse forces $Q_1$ are known to be produced due to the mass accelerations accompanying the bending oscillations; in this way also laterally directed transverse impulses occur in corresponding manner in the measurement transducer. For example, in the case of an oscillation amplitude of about 0.03 mm, a transverse force of about 100 N would occur in the case of the above mentioned high-grade steel measuring tube. For the case in which these transverse forces can not be compensated, this leads to the fact that the inner part of the measurement transducer suspended on the inlet tube piece 11 and the outlet tube piece 12 is correspondingly pushed laterally out of its assigned static rest position. Accordingly, the transverse forces $Q_1$ would act by way of the inlet and outlet tube pieces 11, 12 at least partially on the connected pipeline and the pipeline would, therefore, likewise, be caused to vibrate. As earlier explained, measuring tube 10 can also be counterbalanced by means of the counteroscillator 20 practically only for a single value of the density of the medium and at best dynamically over a very narrow range of density of the medium; compare FIG. 6b. Thus, in the case of fluctuating density $\rho$ of the medium, the measuring tube 10, and, as a result, practically the entire inner part, is laterally shifted out of the rest position symbolized in FIG. 6a to d by the longitudinal axis L, and, indeed, in the case of lower density $\rho$ beneath the density value of the medium, in the direction of its own oscillatory movement, as schematically shown in FIG. 6c, or, in the case of higher density above the mentioned value of the density of the medium, in the direction of the oscillatory movement of the counteroscillator 20 as schematically shown in FIG. 6d. As a result, the counteroscillator 20 serves more toward dynamically counterbalancing the measurement transducer for exactly one predetermined value of the density of the medium e.g. one to be expected most frequently during operation of the measurement transducer or also a critical value of the density of the medium, e.g. the density of water, to such an extent that the transverse forces $Q_1$ produced in the vibrating measuring tube are compensated as completely as possible and the measuring tube then does practically not leave its static rest position; compare FIGS. 6a, 6b. In order to enable an as practical and simple tuning as possible of the counteroscillator 20 to the mentioned value of the density of the medium as possible and to the then actually excited oscillatory form of the measuring tube 10, an embodiment of the invention provides for the adding, especially the releasable adding, of discrete mass pieces 201, 202 to the counteroscillator 20. The mass pieces 201, 202 can be e.g. disks screwed externally on protruding bolts affixed to the measuring tube, or short tubular pieces inserted onto the measuring tube 10. Additionally, a corresponding mass distribution can be implemented via the counteroscillator 20 e.g. also by the forming of longitudinal or annular grooves. A mass distribution suited for the particular application can, without more, be determined in manner known to those skilled in the art initially e.g. by means of finite element calculations and/or by means of experimental measurements. In case required, of course, also more than the shown two mass pieces 201, 202 can be used.

For further improved dynamic balancing of the measurement transducer, especially also in the case of media with significantly fluctuating density $\rho$, and also with a view to the decoupling principles for bending and/or torsional oscillations disclosed in U.S. Pat. Nos. 6,691,583 or 6,840,109, the cantilever 15 is essentially rigidly coupled to the inlet tube piece 11, counteroscillator 20, and measuring tube 10, and the cantilever 16 is essentially rigidly coupled to the outlet tube piece 12, counteroscillator 20, and measuring tube 10. In such case, the cantilevers 15, 16, which are especially arranged as close as possible to measuring tube 10, can be connected with the, in each case, other components of the inner part, for example, the counteroscillator 20, by material as well as also by shape and/or force connections. Accordingly, the cantilevers can e.g. be welded, soldered, brazed, clamped, and/or pressed in place. In this manner, by means of the cantilevers 15, 16, first mass moments of inertia $J_{15x}$, $J_{16x}$ are created acting equally eccentrically (thus not at the belonging centers of mass $M_{15}$, $M_{16}$) on the respective locations of securement.

These first mass moments of inertia $J_{15x}$, $J_{16x}$ are not principle moments of inertia of the respective cantilevers 15, 16. By way of example, each of the cantilevers 15, 16 can, for such purpose, be affixed, at least in part, directly to the counteroscillator 20.

For the aforementioned case wherein the cantilevers 15, 16 are, in each case, to be clamped onto counteroscillator 20 and/or the associated connecting tube piece, they can be affixed e.g. also by means of corresponding threaded connections. Thus FIGS. 7a, b show, in the context of cantilever 15, an advantageous clamp connection for cantilevers of the described kind. The cantilever has, in such case, been affixed to the counteroscillator, following insertion thereon, by means of at least two, mutually parallel, traversing bolts 15, 15b and corresponding nuts 15c, 15d, with the two traversing bolts 15a, 15b being placed in traversing bores 15e, 15f located in mutually opposing sides in the cantilever 15. For preventing an unintentional loosening of the nuts 15c, 15d, these can, in case required, following assembly, additionally be connected with the respective traversing bolts in suitable manner, e.g. by means of metal adhesive, adhesively, and/or, e.g. by welding and/or brazing, materially. In order to assure a best possible, force-connection between cantilever 15 and counteroscillator 20 at acceptable clamping forces in the traversing bolts 15a, 15b and in the counteroscillator 20, the variant shown here additionally provides radially traversing, longitudinal slits 15g, 15h essentially aligned with the longitudinal axis L and situated on the surfaces turned toward the counteroscillator 20 and the measuring tube 20.

In the case of lateral movements of the two coupling zones 11#, 12#, for example due to density-dependent imbalances between measuring tube 10 and counteroscillator 20 and/or due to disturbance oscillations externally coupled into the measurement transducer, bending moments are produced in each case, thus, on the part of the cantilever 15, in the inlet tube piece 11 and, on the part of the cantilever 16, in the outlet tube piece 12, which, due to the eccentricity and the mass inertia of the cantilevers 15, 16, are so directed that deformations of the inlet and outlet tube pieces 11, 12 associated therewith are directed opposite to the lateral movements of the coupling zones 11#, 12#. In other words, the cantilevers 15, 16 are so formed and dimensioned that first mass moments of inertia $J_{15x}$, $J_{16x}$, resulting therefrom about respective imaginary rotational axes $D_{15x}$, $D_{16x}$, extending transversely to the longitudinal axis L but, however, spaced from a principle axis of inertia of the respective cantilevers parallel thereto do it is true allow a twisting of the cantilevers 15, 16 in the case of accelerated lateral displacement of the coupling zones 11#, 12#, but the, in each case, belonging centers of mass $M_{15}$, $M_{16}$, remain, at least laterally, essentially locationally fixed in those static rest position in each case assigned them on the basis of the concrete mechanical, geometrical properties of the cantilevers 15, 16. As a result, each of the centers of mass $M_{15}$, $M_{16}$ forms practically a point of rotation for the rotational movements of the cantilevers 15, 16 producing the bending moments.

The mass moments of inertia $J_{15}$, $J_{16}$, of the cantilevers 15, 16 acting eccentrically in the aforementioned manner on the respective locations of securement compel, therefore, (due to the pendulum-like motion about the respective practically locationally resting centers of mass $M_{15}$, $M_{16}$ resulting from the accelerated lateral shifting motions V of the measuring tube 10) an additional twisting of the respective associated locations of securement about the imaginary first axes of rotation $D_{15x}$, $D_{16x}$, perpendicular to this lateral shifting motion V, as well as to the longitudinal axis L, or, as the case may be, about the imaginary second axes of rotation $D_{15x}$, $D_{16x}$, essentially parallel to the first ones; compare FIGS. 6c and *d*. This twisting, as shown again enlarged in FIG. 8, practically of the entire inlet side first coupling zone 11#, especially of the inlet end, in turn effects, at least sectionally, an additional bending of the inlet tube piece 11 counter to the shifting movement V of the measuring tube 10, which corresponds practically to a uniaxial, transverse force free, and thus largely shear stress free bending; in analogous manner, the outlet tube piece 12 is likewise bent in opposite direction to the shifting motion V.

The two cantilevers 15, 16 are, as also shown in FIGS. 1 to 4, affixed on one side; thus, solely in the region of the coupling zones 11#, 12#. For suppressing possible undesired modes of oscillation, it is further possible, as shown schematically in FIG. 8, to provide spring and/or damping elements serving, however, additionally for the stabilizing of the centers of mass $M_{15}$, $M_{16}$ of the cantilevers 15 and 16 in their respective rest positions. These additional elements lie e.g. transversely to the main oscillation plane, or, as shown here, they lie essentially in the main oscillation plane, and are affixed, in each case, to the cantilever mass and to the transducer housing 30.

The dimensioning of the inner part including the measuring tube, the counteroscillator, the inlet and outlet pieces, as well as the cantilevers, plus the bendings of the inlet and outlet tube pieces 11, 12 influenced thereby, can be optimized e.g. by means of computer supported simulation calculations or by means of experimental measurements, such that counterforces $Q_2$ produced by the bending, completely, or at least largely, compensate the above mentioned transverse forces $Q_1$ in the vibrating measuring tube 10 over as wide a fluctuation range of density as possible, and, indeed, such that externally on the transducer housing 30 and consequently also on the connected pipeline practically no transverse forces arise caused by the vibrating measuring tube 10, or, as required, as caused also by the entire oscillating inner part. Possible deformations of the connected pipeline due to bending moments produced in this way can, for example, without more, be suppressed by an appropriately high bending stiffness of the transducer housing 30.

According to another embodiment of the invention, it is provided that the measuring tube 10 driven by the exciter mechanism is caused to vibrate during operation predominantly and/or at least at times with an oscillation frequency, $f_{exc}$, which corresponds at least to 1.5 times a lowest natural eigenfrequency of the oscillatable inner part of the measurement transducer, which as already indicated is formed at least by means of the measuring tube 10 itself, the counteroscillator 20, the inlet tube piece 11, the outlet tube piece 12, as well as the two cantilevers 15, 16. In other words, the natural resonance frequency of the wanted mode should correspond to at least 1.5 times and possibly, however, more than 2 times the lowest natural eigenfrequency of the inner part. For the here presented dimensioning of the inner part, its lowest natural eigenfrequency in the case of empty measuring tube would amount, for example, to about 250 Hz or less, while it would, in the case of a water filled measuring tube, lie in the order of magnitude of 200 Hz or lower.

Further investigations have now shown that this aforementioned requirement can be effectively realized, especially also while maintaining the decoupling principle disclosed in U.S. Pat. Nos. 6,691,583 or 6,840,109 and consequently, especially as compared to the measurement transducers disclosed in U.S. Pat. Nos. 6,691,583 or 6,840,109, considerable improvements as concerns disturbance resistance and, as a result, also the measurement accuracy of inline measuring devices of the described kind, can be achieved by so embodying each of the two cantilevers 15, 16 in such a manner that they have in comparison to the mass, $m_{10}$, of the measuring tube 10, a considerably larger mass, $m_{15}$, $m_{16}$, and indeed, at least in the order of magnitude of the mass, $m_{20}$, of the counteroscillator 20. Therefore, it is further provided for the measurement transducer of the invention that the counteroscillator 20 and the cantilevers 15, 16 are so dimensioned that the mass, $m_{15}$, $m_{16}$, of each of the two cantilevers 15, 16 is at least equal to a mass, $m_{20}$, of the counteroscillator 20. According to a further embodiment of the invention, each of the two cantilevers 15, 16, has a mass, $m_{15}$, $m_{16}$, which is greater than 1.5 times the mass, $m_{20}$, of the counteroscillator 20. Depending on the nominal diameter of the measuring tube being used, therefore, the mass, $m_{15}$, $m_{16}$, of each of the two cantilevers 15, 16, can, without more, be greater than 10 times the mass, $m_{10}$, of the measuring tube 10. Additionally, it was possible in this case to determine, further, that good results as regards the disturbance resistance can be achieved when each of the two cantilevers 15, 16, has a mass, $m_{15}$, $m_{16}$, which is smaller than 5 times the mass, $m_{20}$, of the counteroscillator 20 or which at least for the measuring tubes of greater nominal diameter above 50 mm, corresponds at most even only to 3 times the mass, $m_{20}$, of the counteroscillator 20.

According to a further embodiment of the invention, each of the cantilevers 15, 16, is so dimensioned that their respective masses, $m_{15}$, $m_{16}$, amount to more than 5 kg, especially more than 10 kg, and yet, however, is smaller than 50 kg.

In order to provide a sufficiently large mass, $m_{15}$, $m_{16}$, each of the cantilevers, in a further embodiment of the invention, is so constructed that it has at least a largest wall thickness, which is greater than a largest wall thickness of the counteroscillator. Additionally, in the presented example of an embodiment, each of the cantilevers 15, 16, is, however, also so dimensioned that it has a smallest wall thickness, which is greater than the largest wall thickness of the counteroscillator 20, whereby not only a correspondingly high mass, $m_{15}$, $m_{16}$, can be achieved but also an, in comparison to the measuring tube 10 and the counteroscillator 20, correspondingly high bending stiffness for each of the cantilevers 15, 16.

In a further embodiment of the invention, at least the measuring tube 10 and the cantilevers 15, 16, are so dimensioned to be matched to one another that the measuring tube 10 filled with water exhibits a lowest natural eigenfrequency, $f_{10, H2O}$, for which at least the following holds:

$$f_{10} \geq \frac{1}{2\pi} \cdot \sqrt{\frac{12 \cdot E_{11} \cdot I_{11} / L_{11}^3}{m_{15}}},$$

wherein $E_{11}$ is the modulus of elasticity of the material of the inlet tube piece 11 and $I_{11}$ is an axial, areal moment of inertia of the inlet tube piece 11 effective, or average, for the oscillations of the inner part as defined above. This areal moment of inertia results in known manner on the basis of the relationship:

$$I_{11} = \frac{\pi}{64}[(DN+d)^4 - d^4].$$

In such case, the expression $E_{11} \cdot I_{11} / L_{11}^3$ corresponds essentially to the spring constant determined by the inlet tube piece 11 and, in the end, determinative for the oscillations of the inner part and which is, for practical purposes, also equal (at least for an essentially symmetric construction of the inner part) to the spring constant of the outlet tube piece 12 determined in analogous manner. As a result, the following relationship holds in the case of essentially symmetric construction:

$$\sqrt{\frac{E_{11} \cdot I_{11} / L_{11}^3}{m_{15}}} = \sqrt{\frac{E_{12} \cdot I_{12} / L_{12}^3}{m_{16}}}.$$

In a further embodiment, it is provided that, for the oscillation frequency, $f_{exc}$, with which the measuring tube 10 predominantly vibrates during operation at least at times, the following holds:

$$f_{exc} > \frac{1}{2\pi} \cdot \sqrt{\frac{12 \cdot E_{11} \cdot I_{11} / L_{11}^3}{m_{15}}}.$$

In this way, thus, the inlet and outlet tube pieces, as well as the masses, $m_{15}$, $m_{16}$, of the cantilevers 15, 16, are so matched to one another that already by them, a lowest natural eigenfrequency of the inner part is defined below that expected during operation for the oscillation frequency, $f_{exc}$, of the measuring tube dependent on the density of the medium to be measured.

In order to achieve this, as well as an, in spite thereof, as delay free as possible, twisting of the cantilevers 15, 16, and, as a result, a high band width of the decoupling mechanism, the cantilevers 15 and 16 are additionally so formed and affixed to the measuring tube 10 that a quotient of the aforementioned first mass moment of inertia, $J_{15x}$, $J_{16x}$, divided by the respective cantilever mass $m_{15}$ or $m_{16}$ is as small as possible. Experimental investigations have in such case additionally shown that, especially even in the case of the use of relatively heavy and, as a result, cantilevers 15, 16, which would be considered harder to get moving, of, for example, in each case, more than 10 kg, a relatively high disturbance resistance of the measurement transducer can be achieved, while, at the same time, keeping the same high dynamics when the quotient $J_{15x}/m_{15}$, $J_{16x}/m_{16}$ of the respective mass moments of inertia, $J_{15x}$, $J_{16x}$, of each cantilever 15, 16, to their respective masses, $m_{15}$, $m_{16}$, is kept smaller than 0.03 m², especially lying in a region between 0.001 m² and 0.01 m². Pursuing this further, it was possible, by investigating the oscillatory behavior of measurement transducers of the described kind of different nominal diameters, to determine that, as regards disturbance resistance and dynamics, good results can be achieved when a ratio of the aforementioned quotient $J_{15x}/m_{15}$, of the cantilever 15, as well as a ratio of the quotient $I_{16x}/m_{16}$, of the second cantilever 16, to a cross sectional area of the measuring tube $A_{10}$ (intended here is the areal content) is kept as small as possible, especially smaller than 10. Considering this situation, it is provided in a further embodiment of the invention that the cantilevers 15, 16, are in each case so embodied and dimensioned as a function of the nominal diameter DN of the measuring tube selected for the actual measurement transducer that the cantilever 15 fulfills at least the condition $$0.5 < \frac{J_{15x}}{m_{15} \cdot A_{10}} < 5$$

and the cantilever 16 fulfills at least the condition $$0.5 < \frac{J_{16x}}{m_{16} \cdot A_{10}} < 5.$$

According to a further embodiment of the invention, the cantilevers 15, 16 are additionally so embodied that each of the two first mass moments of inertia, $J_{15x}$, $J_{16x}$, amount to at least 0.01 kg·m².

For the above mentioned case in which the measurement transducer is to be operated in a dual mode in which the measuring tube 10 executes both, at least at times, bending oscillations as well as also, at least at times, torsional oscillations, besides the respective mass moments of inertia, $J_{15x}$, $J_{16x}$, of each cantilever 15, 16 about the associated axes of rotation, $D_{15x}$, $D_{16x}$, also significantly of interest are those second mass moments of inertia, $J_{15z}$, $J_{16z}$, of the cantilevers 15, 16 which oppose the accelerated twisting of the same about an, in each case, imaginary rotational axis, $D_{15z}$, $D_{16z}$, essentially parallel to the longitudinal axis L. For the measurement transducer shown in the example of an embodiment, in which the cantilevers align both with inlet and outlet tube pieces, as well as also with measuring tube and counteroscillator, the mass moments of inertia, $J_{15z}$, $J_{16z}$, correspond essentially to one of the three principle moments of inertia of the respective cantilever 15, 16 and the rotational axis, $D_{15z}$, $D_{16z}$, essentially to, in each case, the associated principle axis of inertia. According to a further embodiment of the invention, the cantilevers 15, 16 are therefore so dimensioned that a ratio $J_{15x}/J_{15z}$, $J_{16x}/J_{16z}$ of the, in each case, first mass moment of inertia, $J_{15x}$, $J_{16x}$, of each of the cantilevers 15, 16 to its respective second mass moment of inertia, $J_{15z}$, $J_{16z}$, is smaller than 5, especially smaller than 2. At least for the above described case that each of the two mass moments of inertia, $J_{15x}$, $J_{16x}$, amounts at least to 0.01 kg·m², also each of the two second mass moments of inertia $J_{15z}$, $J_{16z}$, amounts to at least about 0.01 kg·m².

The cantilevers 15, 16 are, in a further embodiment of the invention, additionally so embodied that they exhibit a lowest bending stiffness about the respective axis of rotation $D_{15x}$, $D_{16x}$, which is larger than a comparable bending stiffness $E_{11} \cdot I_{11}$ of the inlet tube piece 11 and a corresponding bending stiffness $E_{12} \cdot I_{12}$ of the outlet tube piece 12 with reference to the same axis of rotation $D_{15x}$, respectively $D_{16x}$. For the above mentioned case in which also the corresponding lengths $L_{15}$, $L_{16}$ of the respective cantilevers 15, 16 is selected to be clearly smaller than the corresponding length, $L_{11}$, of the inlet tube piece 11 and the corresponding length, $L_{12}$, of the outlet tube piece 12, than it is also possible to assure, without more, that the corresponding spring constant of each of the cantilevers 15, 16 is always greater than the above mentioned spring constant of the inlet tube piece 11 proportional to $E_{11} \cdot I_{11}/L^3_{11}$ and the corresponding spring constant ($\sim E_{12} \cdot I_{12}/L^3_{12}$) of the outlet tube piece 12.

For optimum adapting of the required masses, mass moments of inertia and/or bending stiffnesses of the cantilevers 15, 16 to the actually predetermined conditions, especially as given by the measuring tube 10 and/or the counteroscillator 20, additionally or alternatively to the above-mentioned annular groove, also longitudinal grooves 15i, 15j can be provided in the respective cantilevers. As indicated in FIGS. 7a and 7b on the basis of the cantilever 15, these longitudinal grooves are essentially aligned with the longitudinal axis L.

As can be recognized without difficulty from the above explanations, the measurement transducer of the invention distinguishes itself by having a multiplicity of possibilities for adjustment or tuning which enable those skilled in the art, especially also after a specification of the outer or inner installation dimensions, to achieve a high-quality compensation of transverse forces produced in the measuring tube 10 and, as the case may be, in the counteroscillator 20. The above mentioned parameters, especially the masses $m_{15}$, $m_{16}$, the first and second moments of inertia $J_{15x}$, $J_{16x}$, as well as also the ratios derived there from can, in such case, without more, be correspondingly adapted within wide ranges to the nominal diameter DN actually provided for the measuring tube 10 as well as also correspondingly for the installation length provided for the measurement transducer. The measurement transducer of the invention is in such case suited both for measuring tubes with quite small nominal diameters DN of less than 10 mm, as well as also, especially for use in pipelines having a caliber of more than 50 mm and also the measuring tubes associated therewith having nominal diameters of essentially greater than 40 mm.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measurement transducer of vibration-type for a medium flowing in a pipeline, said measurement transducer comprising:
    a essentially straight measuring tube vibrating at least at times during operation and serving for conveying the medium, said measuring tube communicating with the pipeline via an inlet tube piece on an inlet end and an outlet tube piece on an outlet end;
    a counteroscillator affixed to the measuring tube at the inlet end to form a first coupling zone and at the outlet end to form a second coupling zone, said first and second coupling zones being imaginarily connected by a longitudinal axis of the measurement tube;
    a first cantilever for producing bending moments in the inlet tube piece, said first cantilever being coupled in the region of the first coupling zone essentially rigidly with the inlet tube piece and the measuring tube, said first cantilever having a first mass moment of inertia, $J_{15x}$, about an imaginary first rotational axis, $D_{15x}$, lying in the first coupling zone, as well as said first cantilever having a second mass moment of inertia, $J_{15z}$, about an imaginary second axis of rotation, $D_{15z}$, lying essentially parallel to the longitudinal axis of the measuring tube; and
    a second cantilever for producing bending moments in the outlet tube piece, said second cantilever being coupled in the region of the second coupling zone essentially rigidly with the outlet tube piece and the measuring tube, and said second cantilever having a first mass moment of inertia, $J_{16x}$, about an imaginary second axis of rotation, $D_{16x}$, lying in the second coupling zone and being essentially parallel to the first axis of rotation, $D_{15x}$, as well as said second cantilever having a second mass moment of inertia, $J_{16z}$, about an imaginary second axis of rotation, $D_{16z}$, lying essentially parallel to the longitudinal axis of the measuring tube,
    wherein a ratio, $J_{15x}/J_{15z}$, $J_{16x}/J_{16z}$, of the first mass moment of inertia of the cantilevers to its respective second mass moment of inertia, $J_{15z}$, $J_{16z}$, is smaller than 5.

2. The measurement transducer as claimed in claim 1, wherein a ratio, $J_{15x}/J_{15z}$, $J_{16x}/J_{16z}$, of the first mass moment of inertia, $J_{15x}$, $J_{16x}$, of each of the cantilevers to its respective second mass moment of inertia, $J_{15z}$, $J_{16z}$, is smaller than 2.

3. The measurement transducer as claimed in claim 1, wherein each of the two first mass moments of inertia, $J_{15x}$, $J_{16x}$, amounts at least to 0.01 kg·m².

4. The measurement transducer as claimed in claim 1, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, is smaller than 0.03 m².

5. The measurement transducer as claimed in claim 1, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, lies in a range between 0.001 m² and 0.01 m² .

6. The measurement transducer as claimed in claim 1, wherein a ratio of the quotient $J_{15x}/m_{15}$ of the first cantilever, as well as also a ratio of the quotient $J_{16x}/m_{16}$,of the second cantilever, to a crossectional area, $A_{10}$, of the measuring tube is smaller than 10.

7. The measurement transducer as claimed in any preceding claim, wherein the first cantilever fulfills the condition $$0.5 < \frac{J_{15x}}{m_{15} \cdot A_{10}} < 5$$

and the second cantilever fulfills the condition $$0.5 < \frac{J_{16x}}{m_{16} \cdot A_{10}} < 5.$$

8. The measurement transducer as claimed in claim 1, wherein the imaginary first rotational axis, $D_{15x}$, extends transversely to said longitudinal axis of said measuring transducer.

9. The measurement transducer as claimed in claim 1, wherein the imaginary first rotational axis, $D_{15x}$, extends transversely to said longitudinal axis of said measuring tube.

10. The measurement transducer as claimed in claim 1,
    wherein each of said first and second cantilevers has a mass, $m_{15}$, $m_{16}$, which is greater than 1.5 times the mass, $m_{20}$, of the counteroscillator; and/or
    wherein each of said first and second cantilevers has a mass, $m_{15}$, $m_{16}$, which is smaller than 5 times the mass, $m_{20}$, of the counteroscillator; and/or
    wherein each of said first and second cantilevers has a mass, $m_{15}$, $m_{16}$, which corresponds at most to 3 times the mass, $m_{20}$, of the counteroscillator; and/or
    wherein each of said first and second cantilevers has a mass, $m_{15}$, $m_{16}$, which is larger than a mass, $m_{20}$, of the counteroscillator; and/or
    wherein each of said first and second cantilevers has a mass, $m_{15}$, $m_{16}$, which corresponds at least to 10 times a mass, $m_{10}$, of the measuring tube; and/or
    wherein each of the cantilevers has a length, $L_{15}$, $L_{16}$, which corresponds at most to 0.5 times a length, $L_{10}$, of the measuring tube; and/or
    wherein each of the cantilevers has a length, $L_{15}$, $L_{16}$, which is smaller than 0.4 times a length, $L_{10}$, of the measuring tube; and/or
    wherein the mass, $m_{20}$, of the counteroscillator corresponds at least to 5 times the mass, $m_{10}$, of the measuring tube.

11. The measurement transducer as claimed in claim 1, wherein the measuring tube is surrounded at least partially by the counteroscillator; and/or wherein the counteroscillator is tubular.

12. The measurement transducer as claimed in claim 1, wherein measurement measuring tube, inlet tube piece and outlet tube piece are segments of a single, one-piece tube; and/or wherein each of the two cantilevers is essentially embodied in tubular or sleeve form; and/or wherein each of the cantilevers has a largest wall thickness which is greater than a largest wall thickness of the counteroscillator; and/or wherein each of the cantilevers has a smallest wall thickness which is greater than a greatest wall thickness of the counteroscillator; and/or wherein the counteroscillator has an inner diameter of more than 50 mm and/or a wall thickness of more than 5 mm; and/or wherein the measuring tube has an inner diameter of more than 40 mm and/or a wall thickness of more than 2 mm.

13. The measurement transducer as claimed in claim 1, wherein measuring tube and counteroscillator are directed essentially coaxially with one another; and/or wherein the measuring tube executes during operation, at least at times, bending oscillations about a bending oscillation axis essentially parallel to, especially coinciding with, a longitudinal axis; and/or wherein the measuring tube executes during operation, at least at times, torsional oscillations about a torsional oscillation axis essentially parallel with, especially coinciding with, the longitudinal axis.

14. The measurement transducer as claimed in claim 1, wherein the inlet tube piece and the outlet tube piece are essentially straight.

15. The measurement transducer as claimed in any preceding claim, wherein the inlet tube piece and outlet tube piece are directed essentially in alignment with respect to one another, as well as with respect to a longitudinal axis of the measurement transducer imaginarily connecting the two coupling zones.

16. The measurement transducer as claimed in claim 14, wherein a length, $L_{15}$, $L_{16}$, of one of the cantilevers corresponds at most to 0.9 times a length, $L_{11}$, $L_{12}$, of the inlet tube piece; and/or wherein a length, $L_{11}$, of the inlet tube piece, as well as a length, $L_{12}$, of the outlet tube piece corresponds in each case at most to 0.5 times a length, $L_{10}$, of the measuring tube.

17. The measurement transducer as claimed in claim 14, wherein both the inlet tube piece, as well as the outlet tube piece, have respective lengths, $L_{11}$, $L_{12}$, which in each case are smaller than 0.4 times a length, $L_{10}$, of the measuring tube.

18. The measurement transducer as claimed in claim 14, wherein the measuring tube vibrates during operation, at least at times, with an oscillation frequency, $f_{exc}$, for which taking into consideration a length, $L_{11}$, of the inlet tube piece, as well as a bending stiffness $E_{11} \cdot I_{11}$ of the inlet tube piece, the following holds:

$$f_{exc} = \frac{1}{2\pi} \cdot \sqrt{\frac{12 \cdot E_{11} \cdot I_{11}/L_{11}^3}{m_{15}}} \; ; \; \text{and/or}$$

wherein the measuring tube filled with water has a lowest natural eigenfrequency, $f_{10}$, for which taking into consideration a length, $L_{11}$, of the inlet tube piece, as well as a bending stiffness $E_{11} \cdot I_{11}$ of the inlet tube piece, at least the following holds:

$$f_{10} \geq \frac{1}{2\pi} \cdot \sqrt{\frac{12 \cdot E_{11} \cdot I_{11}/L_{11}^3}{m_{15}}} \; .$$

19. The measurement transducer as claimed in claim 1, wherein the measuring tube, when empty, has a lowest natural eigenfrequency, $f_{10}$, which is greater than or about equal to a lowest natural eigenfrequency, $f_{20}$, of the counteroscillator; and/or wherein a lowest natural eigenfrequency, $f_{10, Hb\, 20}$, of the measuring tube, when filled with water, corresponds at least to 1.1 times a lowest natural eigenfrequency, $f_{20}$, of the counteroscillator.

20. The measurement transducer as claimed in claim 1, wherein each of the cantilevers is affixed, at least in part, directly to the counteroscillator; and/or wherein each of the cantilevers is affixed to the counteroscillator by means of threaded connections; and/or wherein each of the cantilevers contains at least one longitudinal groove; and/or wherein each of the cantilevers contains at least one annular groove.

21. The measurement transducer as claimed in claim 1, wherein each of the cantilevers is formed by means of a sleeve inserted onto the counteroscillator.

22. The measurement transducer as claimed in any preceding claim, wherein each of the sleeves forming the cantilevers has, in each case, at least one annular groove, and wherein the at least one annular groove of each of the two cantilevers is directed essentially coaxially, especially concentrically, to a principal axis of inertia of the respective cantilever.

23. The measurement transducer as claimed in claim 1, further comprising a sensor arrangement for registering oscillations at least of the measuring tube.

24. The measurement transducer as claimed in claim 1, further comprising an exciter mechanism for driving at least the measuring tube.

25. The measurement transducer as claimed in claim 1, wherein the measuring tube vibrates, at least at times, with an oscillation frequency, $f_{exc}$, which corresponds at least to 1.5 times a lowest natural eigenfrequency of an oscillatable inner part of the measurement transducer, as formed at least by means of the measuring tube, the counteroscillator, the inlet tube piece, the outlet tube piece, and the two cantilevers.

26. The measurement transducer as claimed in any preceding claim, wherein the lowest natural eigenfrequency of the inner part is determined essentially by the masses, $m_{15}$, $m_{16}$, $m_{10}$, $m_{20}$, of the cantilevers, the measuring tube, and the counteroscillator, as well as an effective bending stiffness of the inlet and outlet tube pieces, which counteracts such deformations of the inlet and outlet tube pieces, which result from lateral displacements of the coupling zones from their respective static rest positions and therewith associated twistings of the cantilevers about their respective centers of mass, $M_{15}$, $M_{16}$.

27. The measurement transducer as claimed in claim 1, wherein the first cantilever has a center of mass, $M_{15}$, lying in the region of the inlet tube piece, and the second cantilever has a center of mass, $M_{16}$, lying in the region of the outlet tube piece.

28. A measurement transducer of vibration-type for a medium flowing in a pipeline, said measurement transducer comprising:
 a essentially straight measuring tube vibrating at least at times during operation and serving for conveying the medium, said measuring tube communicating with the pipeline via an inlet tube piece on an inlet end and an outlet tube piece on an outlet end;

a counteroscillator affixed to the measuring tube at the inlet end to form a first coupling zone and at the outlet end to form a second coupling zone, said first and second coupling zones being imaginarily connected by a longitudinal axis of the measuring tube;

a first cantilever for producing bending moments in the inlet tube piece, said first cantilever being coupled in the region of the first coupling zone essentially rigidly with the inlet tube piece and the measuring tube, said first cantilever having a first mass moment of inertia, $J_{15x}$, about an imaginary first rotational axis, $D_{15x}$, lying in the first coupling zone, as well as said first cantilever having a second mass moment of inertia, $J_{15z}$, about an imaginary second axis of rotation, $D_{15z}$, lying essentially parallel to the longitudinal axis of the measuring tube; and a second cantilever for producing bending moments in the outlet tube piece, said second cantilever being coupled in the region of the second coupling zone essentially rigidly with the outlet tube piece and the measuring tube, and said second cantilever having a first mass moment of inertia, $J_{16x}$, about an imaginary second axis of rotation, $D_{16x}$, lying in the second coupling zone and being essentially parallel to the first axis of rotation, $D_{15x}$, as well as said second cantilever having a second mass moment of inertia, $J_{16z}$, about an imaginary second axis of rotation, $D_{16z}$, lying essentially parallel to the longitudinal axis of the measuring tube, wherein each of the two first mass moments of inertia, $J_{15x}$, $J_{16x}$, amounts at least to 0.01 kg·m$^2$.

29. The measurement transducer as claimed in claim 28, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, is smaller than 0.03 m$^2$.

30. The measurement transducer as claimed in claim 28, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, lies in a range between 0.001 m$^2$ and 0.01 m$^2$.

31. The measurement transducer as claimed in claim 28, wherein a ratio of the quotient $J_{15x}/m_{15}$, of the first cantilever, as well as also a ratio of the quotient $J_{16x}/m_{16}$, of the second cantilever, to a crossectional area, $A_{10}$, of the measuring tube is smaller than 10.

32. The measurement transducer as claimed in claim 28,
wherein each of said first and second cantilevers has a mass, $m_{15}$, $m_{16}$, which is greater than 1.5 times the mass, $m_{20}$, of the counteroscillator; and/or
wherein each of said first and second cantilevers has a mass, $m_{15}$, $m_{16}$, which is smaller than 5 times the mass, $m_{20}$, of the counteroscillator; and/or
wherein each of said first and second cantilevers has a mass, $m_{15}$, $m_{16}$, which corresponds at most to 3 times the mass, $m_{20}$, of the counteroscillator; and/or
wherein each of said first and second cantilevers has a mass, $m_{15}$, $m_{16}$, which is larger than a mass, $m_{20}$, of the counteroscillator; and/or
wherein each of said first and second cantilevers has a mass, $m_{15}$, $m_{16}$, which corresponds at least to 10 times a mass, $m_{10}$, of the measuring tube; and/or
wherein each of the cantilevers has a length, $L_{15}$, $L_{16}$, which corresponds at most to 0.5 times a length, $L_{10}$, of the measuring tube; and/or
wherein each of the cantilevers has a length, $L_{15}$, $L_{16}$, which is smaller than 0.4 times a length, $L_{10}$, of the measuring tube; and/or
wherein the mass, $m_{20}$, of the counteroscillator corresponds at least to 5 times the mass, $m_{10}$, of the measuring tube.

33. A measurement transducer of vibration-type for a medium flowing in a pipeline, said measurement transducer comprising:

a essentially straight measuring tube vibrating at least at times during operation and serving for conveying the medium, said measuring tube communicating with the pipeline via an inlet tube piece on an inlet end and an outlet tube piece on an outlet end;

a counteroscillator affixed to the measuring tube at the inlet end to form a first coupling zone and at the outlet end to form a second coupling zone, said first and second coupling zones being imaginarily connected by a longitudinal axis of the measuring tube;

a first cantilever for producing bending moments in the inlet tube piece, said first cantilever being coupled in the region of the first coupling zone essentially rigidly with the inlet tube piece and the measuring tube, said first cantilever having a first mass moment of inertia, $J_{15x}$, about an imaginary first rotational axis, $D_{15x}$, lying in the first coupling zone, as well as said first cantilever having a second mass moment of inertia, $J_{15z}$, about an imaginary second axis of rotation, $D_{15z}$, lying essentially parallel to the longitudinal axis of the measuring tube; and a second cantilever for producing bending moments in the outlet tube piece, said second cantilever being coupled in the region of the second coupling zone essentially rigidly with the outlet tube piece and the measuring tube, and said second cantilever having a first mass moment of inertia, $J_{16x}$, about an imaginary second axis of rotation, $D_{16x}$, lying in the second coupling zone and being essentially parallel to the first axis of rotation, $D_{15x}$, as well as said second cantilever having a second mass moment of inertia, $J_{16z}$, about an imaginary second axis of rotation, $D_{16z}$, lying essentially parallel to the longitudinal axis of the measuring tube, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, is smaller than 0.03 m$^2$.

34. The measurement transducer as claimed in claim 33, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, lies in a range between 0.001 m$^2$ and 0.01 m$^2$.

35. The measurement transducer as claimed in claim 33, wherein a ratio of the quotient $J_{15x}/m_{15}$, of the first cantilever, as well as also a ratio of the quotient $J_{16x}/m_{16}$, of the second cantilever, to a crossectional area, $A_{10}$, of the measuring tube is smaller than 10.

36. The measurement transducer as claimed in claim 33,
wherein each of said first and second cantilevers has a mass, $m_{15}$, $m_{16}$, which is greater than 1.5 times the mass, $m_{20}$, of the counteroscillator; and/or
wherein each of said first and second cantilevers has a mass, $m_{15}$, $m_{16}$, which is smaller than 5 times the mass, $m_{20}$, of the counteroscillator; and/or
wherein each of said first and second cantilevers has a mass, $m_{15}$, $m_{16}$, which corresponds at most to 3 times the mass, $m_{20}$, of the counteroscillator; and/or
wherein each of said first and second cantilevers has a mass, $m_{15}$, $m_{16}$, which is larger than a mass, $m_{20}$, of the counteroscillator; and/or
wherein each of said first and second cantilevers has a mass, $m_{15}$, $m_{16}$, which corresponds at least to 10 times a mass, $m_{10}$, of the measuring tube; and/or wherein each of the cantilevers has a length, $L_{15}$, $L_{16}$, which corresponds at most to 0.5 times a length, $L_{10}$, of the measuring tube; and/or wherein each of the cantilevers has a length, $L_{15}$, $L_{16}$, which is smaller than 0.4 times a length, $L_{10}$, of the measuring tube; and/or wherein the mass, $m_{20}$, of the counteroscillator corresponds at least to 5 times the mass, $m_{10}$, of the measuring tube.

37. A measurement transducer of vibration-type for a medium flowing in a pipeline, said measurement transducer comprising:

a essentially straight measuring tube vibrating at least at times during operation and serving for conveying the medium, said measuring tube communicating with the pipeline via an inlet tube piece on an inlet end and an outlet tube piece on an outlet end;

a counteroscillator affixed to the measuring tube at the inlet end to form a first coupling zone and at the outlet end to form a second coupling zone, said first and second coupling zones being imaginarily connected by a longitudinal axis of the measurement tube;

a first cantilever for producing bending moments in the inlet tube piece, said first cantilever being coupled in the region of the first coupling zone essentially rigidly with the inlet tube piece and the measuring tube, said first cantilever having a first mass moment of inertia, $J_{15x}$, about an imaginary first rotational axis, $D_{15x}$, lying in the first coupling zone, as well as said first cantilever having a second mass moment of inertia, $J_{15z}$, about an imaginary second axis of rotation, $D_{15z}$, lying essentially parallel to the longitudinal axis of the measuring tube; and a second cantilever for producing bending moments in the outlet tube piece, said second cantilever being coupled in the region of the second coupling zone essentially rigidly with the outlet tube piece and the measuring tube, and said second cantilever having a first mass moment of inertia, $J_{16x}$, about an imaginary second axis of rotation, $D_{16x}$, lying in the second coupling zone and being essentially parallel to the first axis of rotation, $D_{15x}$, as well as said second cantilever having a second mass moment of inertia, $J_{16z}$, about an imaginary second axis of rotation, $D_{16z}$, lying essentially parallel to the longitudinal axis of the measuring tube, wherein a quotient $J_{15x}/m_{15}$, $J_{16x}/m_{16}$, of the first mass moment of inertia, $J_{15x}$, $J_{16x}$, of each of the cantilevers to its respective mass, $m_{15}$, $m_{16}$, lies in a range between 0.001 m$^2$ and 0.01 m$^2$.

38. The measurement transducer as claimed in claim 37, wherein a ratio of the quotient $J_{15x}/m_{15}$, of the first cantilever, as well as also a ratio of the quotient $J_{16x}/m_{16}$, of the second cantilever, to a crossectional area, $A_{10}$, of the measuring tube is smaller than 10.

39. The measurement transducer as claimed in claim 37, wherein each of said first and second cantilevers has a mass, $m_{15}$, $m_{16}$, which is greater than 1.5 times the mass, $m_{20}$, of the counteroscillator; and/or wherein each of said first and second cantilevers has a mass, $m_{15}$, $m_{16}$, which is smaller than 5 times the mass, $m_{20}$, of the counteroscillator; and/or wherein each of said first and second cantilevers has a mass, $m_{15}$, $m_{16}$, which corresponds at most to 3 times the mass, $m_{20}$, of the counteroscillator; and/or wherein each of said first and second cantilevers has a mass, $m_{15}$, $m_{16}$, which is larger than a mass, $m_{20}$, of the counteroscillator; and/or wherein each of said first and second cantilevers has a mass, $m_{15}$, $m_{16}$, which corresponds at least to 10 times a mass, $m_{10}$, of the measuring tube; and/or wherein each of the cantilevers has a length, $L_{15}$, $L_{16}$, which corresponds at most to 0.5 times a length, $L_{10}$, of the measuring tube; and/or wherein each of the cantilevers has a length, $L_{15}$, $L_{16}$, which is smaller than 0.4 times a length, $L_{10}$, of the measuring tube; and/or wherein the mass, $m_{20}$, of the counteroscillator corresponds at least to 5 times the mass, $m_{10}$, of the measuring tube.

40. A measurement transducer of vibration-type for a medium flowing in a pipeline, said measurement transducer comprising:

a essentially straight measuring tube vibrating at least at times during operation and serving for conveying the medium, said measuring tube communicating with the pipeline via an inlet tube piece on an inlet end and an outlet tube piece on an outlet end;

a counteroscillator affixed to the measuring tube at the inlet end to form a first coupling zone and at the outlet end to form a second coupling zone, said first and second coupling zones being imaginarily connected by a longitudinal axis of the measurement tube;

a first cantilever for producing bending moments in the inlet tube piece, said first cantilever being coupled in the region of the first coupling zone essentially rigidly with the inlet tube piece and the measuring tube, said first cantilever having a first mass moment of inertia, $J_{15x}$, about an imaginary first rotational axis, $D_{15x}$, lying in the first coupling zone, as well as said first cantilever having a second mass moment of inertia, $J_{15z}$, about an imaginary second axis of rotation, $D_{15z}$, lying essentially parallel to the longitudinal axis of the measuring tube; and a second cantilever for producing bending moments in the outlet tube piece, said second cantilever being coupled in the region of the second coupling zone essentially rigidly with the outlet tube piece and the measuring tube, and said second cantilever having a first mass moment of inertia, $J_{16x}$, about an imaginary second axis of rotation, $D_{16x}$, lying in the second coupling zone and being essentially parallel to the first axis of rotation, $D_{15x}$, as well as said second cantilever having a second mass moment of inertia, $J_{16z}$, about an imaginary second axis of rotation, $D_{16z}$, lying essentially parallel to the longitudinal axis of the measuring tube, wherein a ratio of the quotient $J_{15x}/m_{15}$, of the first cantilever, as well as also a ratio of the quotient $J_{16x}/m_{16}$, of the second cantilever, to a crossectional area, $A_{10}$, of the measuring tube is smaller than 10.

41. The measurement transducer as claimed in claim 40, wherein each of said first and second cantilevers has a mass, $m_{15}$, $m_{16}$, which is greater than 1.5 times the mass, $m_{20}$, of the counteroscillator; and/or wherein each of said first and second cantilevers has a mass, $m_{15}$, $m_{16}$, which is smaller than 5 times the mass $m_{20}$, of the counteroscillator; and/or wherein each of said first and second cantilevers has a mass, $m_{15}$, $m_{16}$, which corresponds at most to 3 times the mass, $m_{20}$, of the counteroscilllator; and/or wherein each of said first and second cantilevers has a mass $m_{15}$, $m_{16}$, which is larger than a mass, $m_{20}$, of the counteroscillator; and/or wherein each of said first and second cantilevers has a mass $m_{15}$, $m_{16}$, which corresponds at least to 10 times a mass, $m_{10}$, of the measuring tube; and/or wherein each of the cantilevers has a length, $L_{15}$, $L_{16}$, which which corresponds at most to 0.5 times a length, $L_{10}$, of the measuring tube; and/or wherein each of the cantilevers has a length, $L_{15}$, $L_{16}$, which is smaller than 0.4 times a length, $L_{10}$, of the measuring tube; and/or wherein the mass, $m_{20}$, of the counteroscillator corresponds at least to 5 times the mass, $m_{10}$, of the measuring tube.

* * * * *